United States Patent [19]

Fujino et al.

[11] Patent Number: 5,723,961
[45] Date of Patent: Mar. 3, 1998

[54] NUMERICAL CONTROL APPARATUS HAVING SPLINE INTERPOLATING FUNCTION

[75] Inventors: Daisuke Fujino; Tomonori Satou, both of Tokyo, Japan

[73] Assignee: Mitsubishi Denki Kabushiki Kaisha, Tokyo, Japan

[21] Appl. No.: 630,765

[22] Filed: Apr. 10, 1996

[30] Foreign Application Priority Data

Jul. 17, 1995 [JP] Japan .................................. 7-180409

[51] Int. Cl.[6] .................. G05B 19/4103; G05B 19/18
[52] U.S. Cl. .................. 318/568.15; 318/570; 318/573; 364/474.31
[58] Field of Search ........................ 318/567, 568.1, 318/568.11, 568.15, 569, 573; 364/474.28–474.33

[56] References Cited

U.S. PATENT DOCUMENTS 5,418,731  5/1995  Yoshimura et al. ............. 318/573 X
5,438,522  8/1995  Crovella ........................... 318/571 X
5,473,542  12/1995  Olomski et al. ................. 318/573 X

FOREIGN PATENT DOCUMENTS 64-81012   3/1989  Japan .
2-36406    2/1990  Japan .
2-113305   4/1990  Japan .

OTHER PUBLICATIONS

Yamaguchi Fumio; Form Processing Engineering, pp. 162–177, published by Nikan Kogyo Shimbun, Japan.

Primary Examiner—Bentsu Ro
Attorney, Agent, or Firm—Sughrue, Mion, Zinn, Macpeak, & Seas PLLC

[57] ABSTRACT

There is provided by the present invention a numerical control apparatus comprising a means for deciding a spline curve by repeating approximation of a tangential vector for an instructed point by required times according to the necessity, a means for controlling a speed by estimated a radius curvature of the decided spline curve, and a means for interpolating a speed on the decided spline curve.

19 Claims, 22 Drawing Sheets

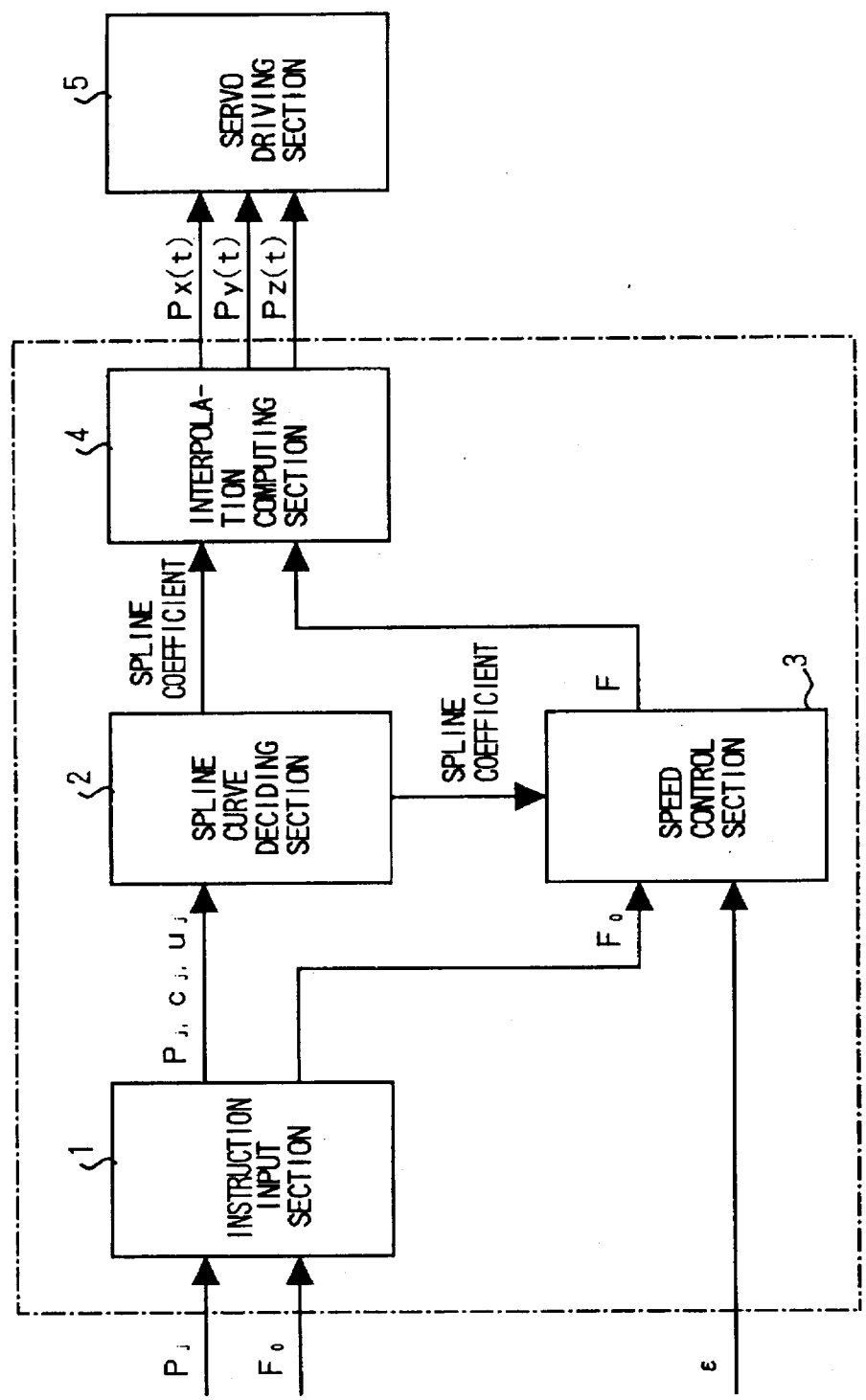
F I G. 11

PROCESSING IN A CASE WHERE FLAG = (SPLINE CURVE)

PROCESSING IN A CASE WHERE FLAG = (END POINT OF SPLINE CURVE)

NUMERICAL CONTROL APPARATUS HAVING SPLINE INTERPOLATING FUNCTION

FIELD OF THE INVENTION

This invention relates to a numerical control apparatus, and more particularly to a numerical control apparatus which provides a smooth control for interpolation for passing through given dot array with a spline interpolating function.

BACKGROUND OF THE INVENTION

Conventionally in a numerical control apparatus, there has been employed a method for controlling a free curve in a space as a path for movement, in which the curve is previously divided into minute zones, data for each minute zone is approximated as minute spline data and given to the numerical control apparatus, and the path for movement is subjected to linear interpolation by using the minute spline data.

As a representative method of approximating a free curve into a minute spline, as shown in FIG. 24, an allowable error $\epsilon$ is set, and instructed points are set so that a distance between a spline connecting the instructed points (pass points) on a curve and the curve will not exceed the allowable error $\epsilon$.

To control a track of a tool at high precision by means of linear interpolation, it is necessary to set an allowable error $\epsilon$ to a small value. In this case, however, a minute spline is extremely short, and a number of instructed point is so large, so that a machining instruction program becomes very long and a machining speed after linear interpolation can not be raised.

To evade the problem as described above, it is desired to set an allowable error $\epsilon$ to a relatively large value and also to roughly set instructed points on a curve for controlling lines connecting the instructed points not by means of linear interpolation, but by means of spline curve interpolation. In order to execute complete spline interpolation, it is necessary to calculate a vast amount of data as described below, and such function is actually impossible in a numerical control apparatus to which real time processing is required.

In a well known theory for a curve (for instance, "Form processing engineering (I)", Fujio Yamaguchi, published by Nikkan Kogyo Shimbun), a point P (t) on a spline curve smoothly passing through n pieces of instructed points $P_1$, $P_2, \ldots P_n$ is expressed by the expression (1) in a zone from $P_{j-1}$ to $P_j$ shown in FIG. 25;

$$p(t) = [t^3 t^2 t 1] \begin{bmatrix} 2 & -2 & 1 & 1 \\ -3 & 3 & -2 & -1 \\ 0 & 0 & 1 & 0 \\ 1 & 0 & 0 & 0 \end{bmatrix} \begin{bmatrix} P_{j-1} \\ P_j \\ c_j q_{j-1} \\ c_j q_j \end{bmatrix} \quad (1)$$

$(j = 2, 3, \ldots, n)$

Herein, $q_j$ is a unit tangential vector at the point $P_j$, while $c_j$ is a distance from $P_{j-1}$ to $P_j$. t is a curve parameter, and is equal to or larger than zero and equal to or smaller than 1.

The spline curve expressed by the expression (1) passes the instructed point $P_j$ (j=1, 2, 3, . . . , n), but if a unit tangential vector $q_j$ is not set to an appropriate value, secondary differentiation at each instructed point is not continuous. Conditions for continuous differentiation at each instructed point $P_j$ (j=2, 3, . . . , n−1) is as expressed by the following expression:

$$c_{j+1}q_{j-1} + 2(c_{j+1} + c_j)q_j + c_j q_{j+1} = \quad (2)$$

$$\frac{3}{c_j c_{j+1}} (c_j^2(P_{j+1} - P_j) + c_{j+1}^2(P_j - P_{j-1}))$$

$(j = 2, 3, \ldots n-1)$

It should be noted that the following conditions for an edge point are added to the edge points $q_1$ and $q_n$.

(i) When giving a tangential vector at an end point:

$q_1$=given value (3a)

$q_n$=given value (3b)

(ii) When a curvature at an end point is set to zero (0):

$2c_2 q_1 + c_2 q_3 = 3(P_2 - P_1)$ (4a)

$c_n q_{n-1} + 2c_n q_n = 3(P_n - P_{n-1})$ (4b)

A teritary spline curve for all zones can be obtained by obtaining a tangential vector $q_j$ in batch by means of solving n pieces of simultaneous equations given by the expressions (2), (3a) and (3b) or expressions (2), (4a) and (4b).

For that purpose, however, it is necessary to read all of then n pieces of instructed points and obtained a reverse matrix of n×n, and a quantity of data to be computed explosively increases in association with increase in a number of instructed points n, and it has been impossible to compute the reverse matrix within a short sampling time in a numerical control apparatus.

SUMMARY OF THE INVENTION

It is an object of the present invention to provide a numerical control apparatus which can compute spline curves successively from a smaller number of points of all dot arrays instructed for a spline curve to pass through and execute interpolation of a track according to the spline curve in real time mode.

In the numerical control apparatus according to the present invention, assuming that a number of repeating times of approximate calculations of tangential vector on pass points is set to k times, if a pass point $P_j$+k ahead of a k point is read in place of reading whole pass points up to an ending point, spline curves between a pass points $P_{j-1}$ and $P_j$ each are successively generated by obtaining tangential vector of the pass point $P_j$ with simple calculations, and a spline curve smoothly connecting at each of pass points can be obtained, so that a smooth spline curve can be generated in real time without a massive amount of load of computing.

A moving speed of a tool can be computed so that the normal acceleration will be within an allowable range for each of decided spline curves at each of pass points, and for this reason an instruction speed at which an interpolation error does not excess an allowable value can be obtained, and high precision machining becomes possible even if a large potion of curve is included within an array of pass points on an instructed arbitrary curve.

In another numerical control apparatus according to the present invention, a moving speed of a tool in a spline curve zone is set so that the normal acceleration at edge points of the spline curve zone will be within an allowable range, and for this reason an instruction speed at which an interpolation error does not excess an allowable value at edge points of the spline curve zone can be obtained, and high precision machining becomes possible even if a large potion of curve is included within an array of pass points on an instructed arbitrary curve.

In another numerical control apparatus according to the present invention, assuming that a number of repeating times of approximate calculations of tangential vector on pass points is set to k times, if a pass point $P_j+k$ ahead of a k point is read in place of reading whole pass points up to an ending point, spline curves between pass points $P_{j-1}$ and $P_j$ are successively generated by obtaining tangential vector on the pass point $P_j$ with simple calculations, and a spline curve smoothly connecting at each of pass points can be obtained, so that a smooth spline curve can be generated in real time without a massive amount of load of computing.

A moving speed of a tool is computed so that, when the tool moves on a straight line according to the spline curve, a maximum clearance between the straight line and the spline curve will be within an allowable range, and for this reason an instruction speed at which an interpolation error does not excess the allowable value can be obtained, and high precision machining becomes possible even if a large portion of curve is included within an array of pass points on an instructed arbitrary curve.

In another numerical control apparatus according to the present invention, the maximum clearance between a straight line and a spline curve is detected according to a maximum curvature in a spline curve zone, and a moving speed of a tool is computed according to the maximum curvature so that a maximum clearance between a straight line and a spline curve will be within an allowable range, and for this reason an instruction speed at which an interpolation error does not excess the allowable value can be obtained without requiring any complicated calculation, and high precision machining becomes possible.

In another numerical control apparatus according to the present invention, tangential vector for each pass point by repeating approximate calculations arbitrary times for tangential vector of an intermediate second point from a positional relation among successive three pass points and also from tangential vectors for the first and third points thereamong is obtained, so that, by means of reading the pass point ahead of two points in place of reading whole pass points up to an ending point, spline curves each are successively generated between the present pass point and the pass point one ahead thereof by obtaining tangential vector on the present pass point with simple calculations, and a spline curve smoothly connecting at each of the pass points can be obtained. For this reason, in this case also, a smooth spline curve can be generated in real time without a massive amount of load of computing.

In another numerical control apparatus according to the present invention, when computing a change rate of a spline parameter per unit time for interpolation, by at first obtaining coordinate values on the spline curve using a parameter change rate during previous unit time for interpolation as a temporary parameter change rate, amount of movement is computed, then computing for convergence is executed so that this amount of movement will coincide with a target amount of movement, and a true parameter change rate is computed through the computing for convergence, and for this reason interpolation with a straight line which has higher tracing capability as compared to a spline curve can be executed, and high precision machining becomes possible.

In another numerical control apparatus according to the present invention, when computing a change rate of a spline parameter per unit time for interpolation, by at first obtaining coordinate values on the spline curve using a parameter change rate during previous unit time for interpolation as a temporary parameter change rate, amount of movement is computed, then computing for a parameter change rate is repeated arbitrary times so that this amount of movement will coincide with a target amount of movement, and a true parameter change rate is computed through this repetition of computing, and for this reason interpolation with a straight line which has comparatively higher tracing capability as compared to a spline curve during an adequate time for computing is executed, and high precision machining becomes possible.

In another numerical control apparatus according to the present invention, in relation to pass points discretely set on the desired curved machining track, a zone of dot array in which a specified number of blocks or more from a start point proceed in a direction, a zone of dot array in which a specified number of blocks or more before an ending point proceed in a direction, or a zone of dot array in which a specified number of blocks or more not including the start point nor an ending point proceed in a direction are recognized as straight line zone, and other zone of dot array is recognized as a spline curve zone, so that even if a portion of a straight line is included within an array of pass points constituting a spline curve, the straight line portion is avoided from its becoming a curve affected by the curve portion successively connected thereto. With this feature, high precision machining becomes possible.

In another numerical control apparatus according to the present invention, when deciding a spline curve in a spline curve zone separated as a straight line zone, a tangential vector for a spline curve at a border point between a straight line zone and a spline curve zone is given as a unit vector indicating a direction of the straight line zone, so that even if a portion of straight line within an array of pass points constituting a spline curve, the straight line portion is avoided from its becoming a curve affected by the curve portion successively connected thereto. With this feature, high precision machining becomes possible.

Namely, when deriving a spline curve from the curve portion, a tangential vector of a contact point coincides with a vector in a direction of the straight line connected thereto, so that, as a result of the machining described above, a straight line portion and a curve portion are smoothly connected to each other.

In another numerical control apparatus according to the present invention, the spline curve deciding means gives a straight line by setting a tertiary coefficient and a secondary coefficient of a spline curve to zero respectively in a straight line zone, so that a straight line can easily be obtained by calculations equivalent to the calculations for computing a spline curve.

Other objects and features of this invention will become understood from the following description with reference to the accompanying drawings.

BRIEF DESCRIPTION OF THE DRAWINGS

FIG. 11 is a block diagram showing key configuration of Embodiment 2 of the numerical control apparatus according to the present invention;

DESCRIPTION OF THE PREFERRED EMBODIMENTS

Detailed description is made for embodiments of the present invention with reference to the related drawings.

Figure 1:
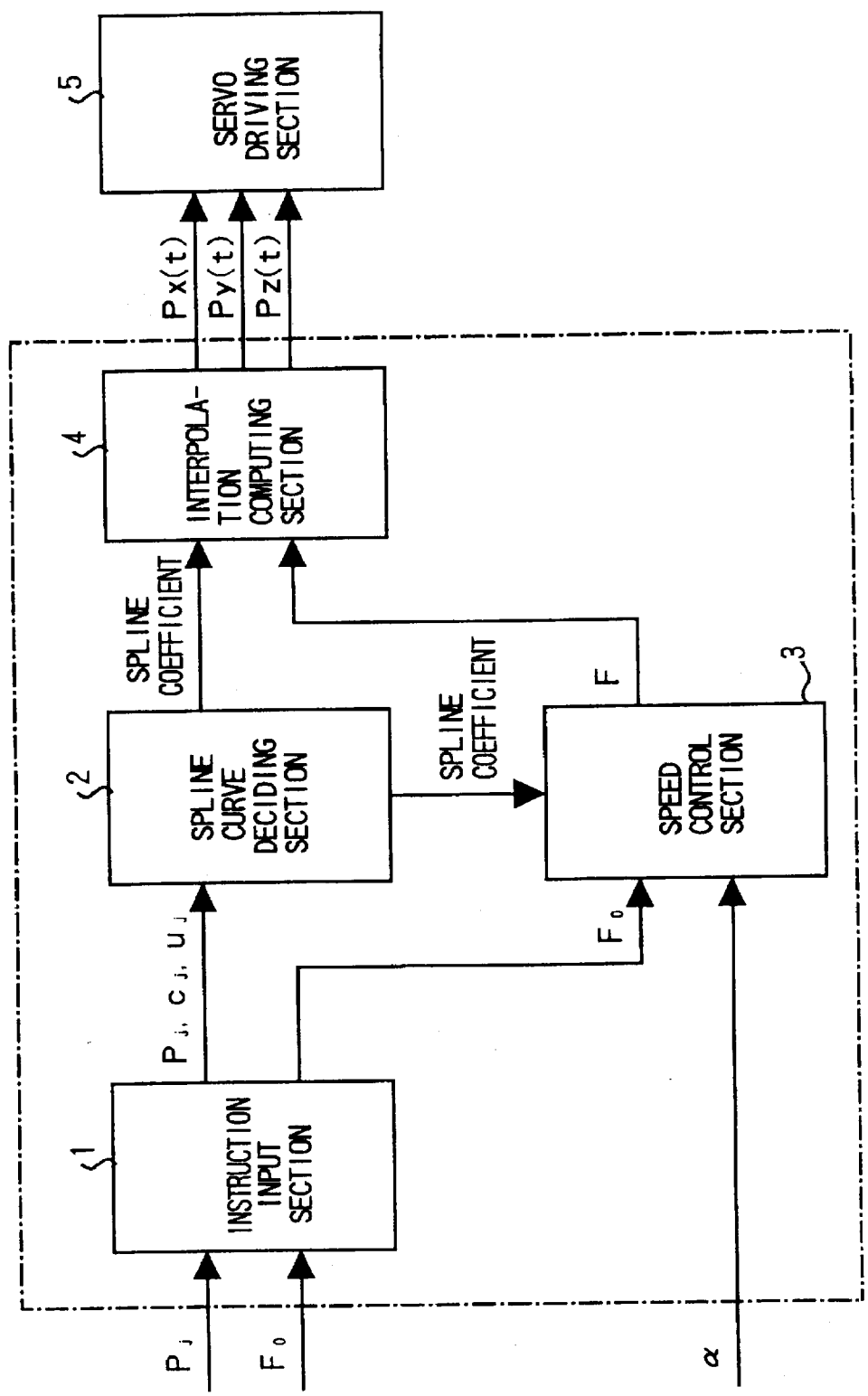
FIG. 1 is a block diagram showing key configuration of Embodiment 1 of a numerical control apparatus according to the present invention.

FIG. 1 shows Embodiment 1 of key configuration of a numerical control apparatus according to the present invention.

The numerical control apparatus comprises an instruction input section 1 for inputting pass point (instructed point) array $P_j$ (j=1, 2, ..., n) on a curved path and a maximum speed instruction value $F_0$, a spline curve deciding section 2 for deciding a spline curve for each zone from the pass point array $P_j$ (j=1, 2, ..., n) inputted into the instruction input section 1 and outputting a spline coefficient for each axis, a speed control section 3 for computing an interpolated speed F from the spline coefficient for each axis computed in the spline curve deciding section, the inputted maximum speed instruction value $F_o$ inputted into the instruction input section 1, and an allowable acceleration $\alpha$, and an interpolation computing section 4 for executing computing for curve interpolation for each sampling time from the spline coefficient for each axis computed in the spline curve deciding means 2 and the interpolated speed F computed in the speed control section 3, and outputs an positional instruction based on the coordinate values Px(t), Py(t), and Pz(t) for each axis computed in the interpolation computing section 4 to a servo driving section 5 comprising servo systems for each axis.

To describe a data flow from the instruction input section 1 to the spline curve deciding section 2 and also to describe contents of computing in the spline curve deciding section 2, at first description is made for a principle of spline curve computing in the device according to the present invention.

The following expression is obtained by deforming Expression (2) above:

$$q_j = \frac{1}{2(c_{j+1}c_j)} \left( \frac{3}{c_jc_{j+1}} (c_j^2(p_{j+1} - P_j) + c_{j+1}^2(P_j - P_{j-1})) - c_{j+1}P_{j-1} - c_jP_{j+1} \right) = \frac{1}{2(c_{j+1} + c_j)} (3(c_ju_{j+1} + c_{j+1}u_j) - c_{j+1}q_{j-1} - c_jq_{j+1}) \quad (6)$$

$(j = 2, 3, \ldots, n - 1)$

Herein, $u_j$ is a unit vector from the instructed point $P_{j-1}$ to $P_j$, which is expressed by Expression (7).

$$u_j = (P_j - P_{j-1})/c_j \quad (7)$$

A basic principle for computing a spline curve in the device according to the present invention is to compute an approximate tangential vector for each instructed point satisfying the Expression (6) above and improve the precision step by step by repeating the computing.

Next, a description is made for the computing sequence, and herein a unit tangential vector at an instructed point $P_j$ obtained when computing is repeated k times is expressed with $q_j^{[k]}$.

(Process 1)

It is assumed that k is equal to zero (K=0), and that it is necessary to obtain a spline curve passing through the three instructed points of $P_{j-1}$, $P_j$, and $P_{j+1}$ with a unit vector at the instructed point $P_{j-1}$ of $u_j$ and a unit vector at the point $P_{j+1}$ of $u_{j+1}$. Namely, a tangential vector $q_j^{[1]}$ at the instructed points $P_{j-1}$ is computed from the Expression (6) through the following Expression (8).

$$q_j^{[1]} = \frac{1}{c_{j+1}+c_j}(c_j u_{j+1} + c_{j+1} u_j) \qquad (8)$$

$$(j = 2, 3, \ldots, n-1)$$

As for the start point (j=1) and end point (j=n), assuming that the curvature at an end point is 0, the spline curve is obtained through the Expressions (4a) and (4b) respectively.

$$q_1^{[k+1]} = \frac{1}{2c_2}(3(p_2 - p_1) - c_2 q_2^{[k+1]}) \qquad (9)$$

$$q_n^{[k+1]} = \frac{1}{2c_n}(3(p_n - p_{n-1}) - c_n q_{n-1}^{[k+1]}) \qquad (10)$$

(Process 2)

Next, k←k+1 is assumed, and a spline curve passing through the three instructed points of $P_{j-1}$, $P_j$, and $P_{j+1}$ with the tangential vector at the instructed point $_{j-1}$ of $q_{j-1}^{[k]}$ and tangential vector at the instructed point $P_{j+1}$ of $q_{j+1}^{[k]}$ is obtained. Herein from the Expression (6), the following expression is applied.

$$q_j^{[k+1]} = \frac{1}{2(c_{j+1}+c_j)}(3(c_j u_{j+1} + c_{j+1} u_j) - c_{j+1} q_{j-1}^{[k]} - c_j q_{j+1}^{[k]}) \qquad (11)$$

The tangential vectors $q_1^{[k+1]}$ and $q_n^{[k+1]}$ are like in process 1 computed through the Expressions (9) and (10), respectively. (Process 3)

The sequence in process 2 and on is repeated arbitrary times.

According to the sequence described above, and by setting the times of repetition to an appropriate value, an approximate spline curve close to a theoretical one can be obtained. Actually, a spline curve available for practical use can be obtained by repeating the sequence 2 times (by computing $q_j^{[2]}$).

Figure 2:
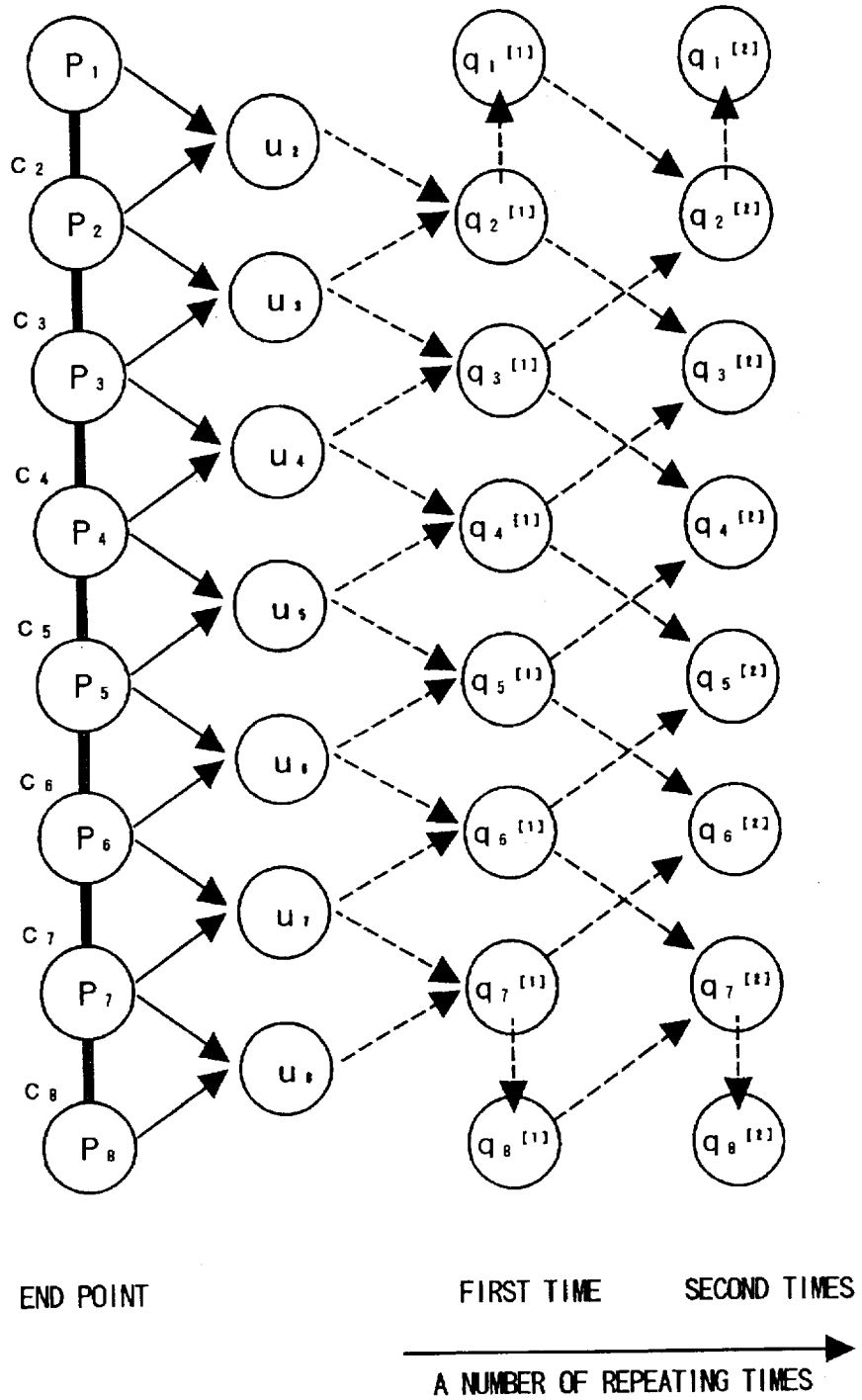
FIG. 2 is a concept diagram showing a sequence of computing when tangential vector of each pass point is obtained through repetition of computing vector in the numerical control apparatus according to the present invention.

FIG. 2 conceptually shows a process to compute up to $q_j^{[2]}$ assuming that j is equal to 1, 2, ..., 8 ($P_8$ is the end point).

Next description is made for contents of computing in the instruction input section 1 and in the spline curve deciding section 2 with reference to the principle of spline curve computing as described above. Herein it is assumed that j is equal to 1, 2, ..., 8 (n=8), and $P_8$ is the end point.

Figure 3:
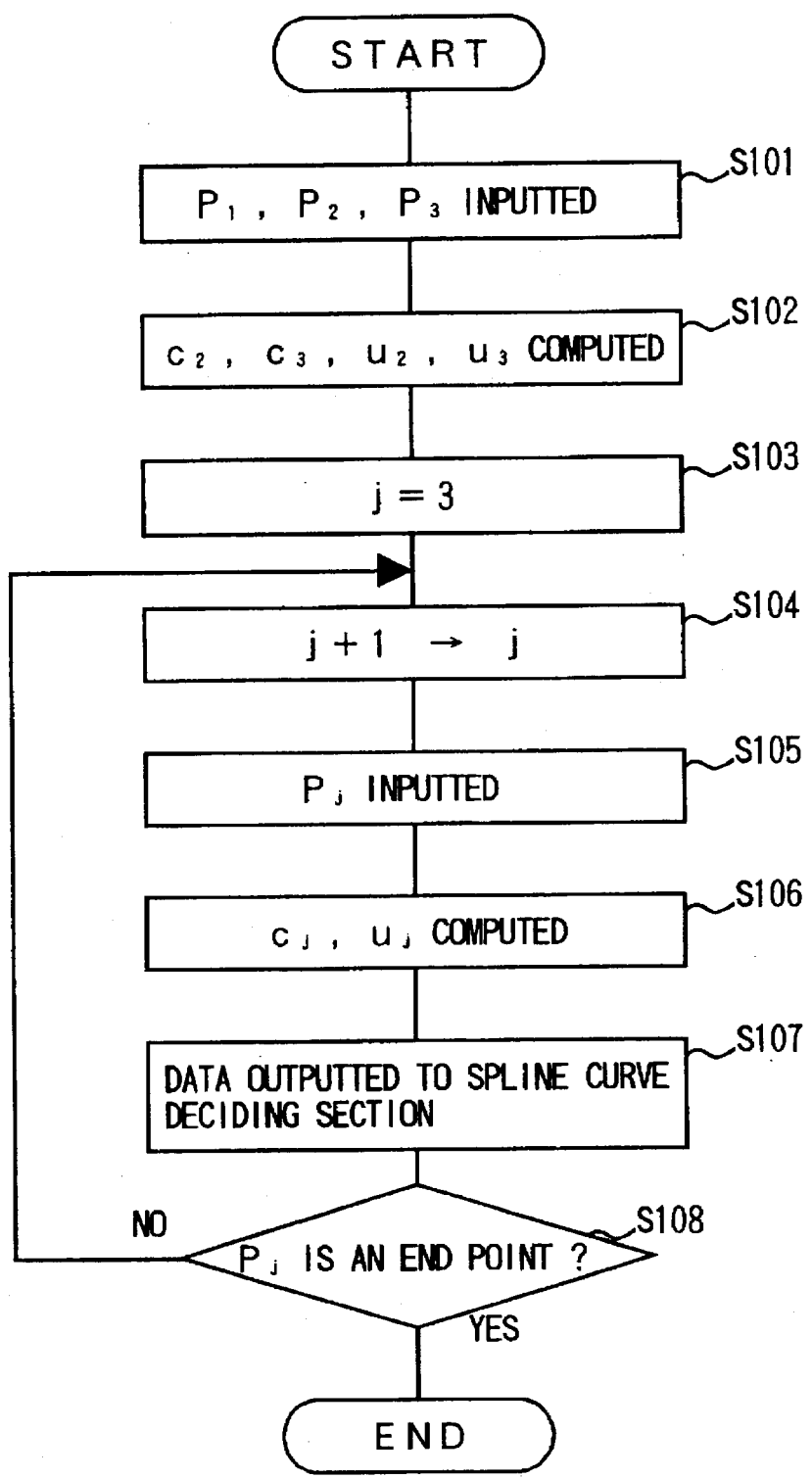
FIG. 3 is a flow chart showing a processing flow in an instruction input section in the numerical control apparatus according to the present invention.

FIG. 3 shows a general operation flow in a processing in the instruction input section 1.

When an instruction for spline interpolation is inputted into the instruction input section 1, the processing flow shown in FIG. 3 is started.

At first, in step S101, coordinate values for three instruction points $P_1$, $P_2$, and $P_3$ from the start point are inputted, and in step S102 a distance $c_2$ from the instructed point $P_1$ to the instructed point $P_2$ and a distance $c_3$ from the instructed point $P_2$ to the instructed point $P_3$ are computed, and then the respective unit vectors $u_2$ and $u_3$ are computed through the Expression (7).

In Step S103, j is initialized to 3 (j=3), and in step S104, j is set to 4 (j is incremented by 1).

In step S105, a coordinate value for the instructed point $P_4$ is inputted, and in step S106, a distance $c_4$ from the instructed point $P_3$ to the instructed point $P_4$, and the unit vector $u_4$ are computed.

Then in step S107, the instruction input section 1 outputs coordinate values for instructed points $P_1$, $P_2$, $P_3$, $P_4$, distances between each instructed point $c_2$, $c_3$, $c_4$, and unit vectors $u_2$, $u_3$, $u_4$ to the spine curve deciding section 2. In step S107, after the spline curve deciding section 2 confirm receipt of the output data, system control goes to the next step S108. Then, as described later, in the spline curve deciding section 2, spline curves for zones between the instructed points $P_1$ to $P_2$ are decided.

In step S108, whether j is equal to n or not, namely whether the point $P_j$ is an end point or not is checked, and if j is not equal to n (j=4, n=8), system control loops to step S104, and j+1 is decremented to j (j+1→j).

If j is not less than 5 (j≧5), in step S105 a coordinate value for the instructed point $P_j$ is inputted, and in step S106, a distance $c_j$ from the instructed point $P_{j-1}$ to the instructed point $P_j$, and the unit vector $u_j$ are computed.

Then in step S107, the instruction input section 1 outputs the coordinate value $P_j$ of the instructed point, the distance $c_j$ between the instructed points, and the unit vector $u_j$ to the spline curve deciding section 2. In step S107, after it is confirmed that the data outputted from the spline curve deciding section 2 was received, system control goes to the next step (S108). Then, as described later, spline curves for each zone between the instructed points $P_{j-3}$ to $P_{j-2}$ are decided in the spline curve deciding section 2.

In step S108, whether j is equal to n or not, namely whether $P_j$ is an end point or not, is checked, and if j is not equal to n (j≠n), system control loops to step S104 and if j is equal to n (n=j), processing is terminated.

Figure 4:
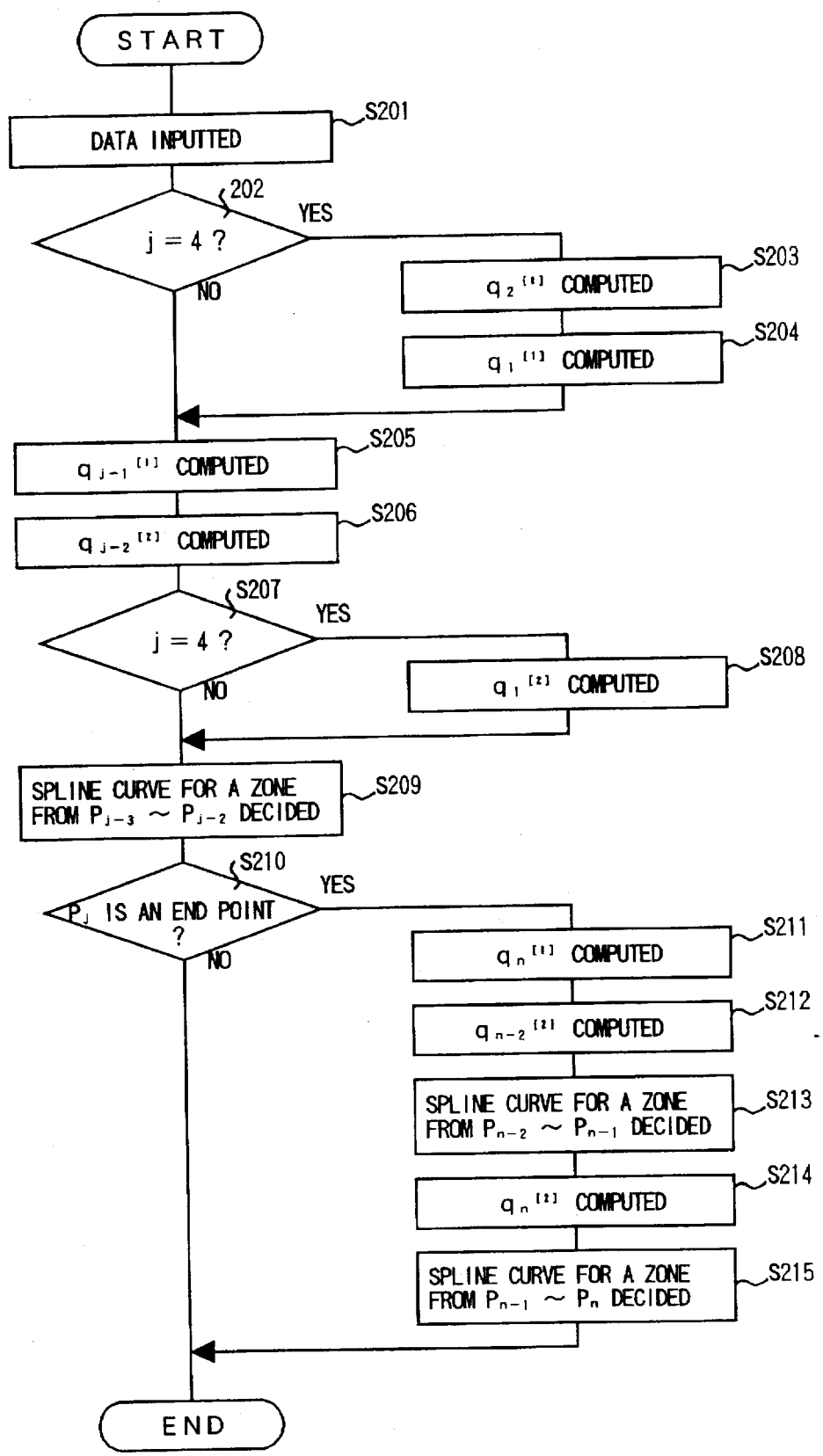
FIG. 4 is a flow chart showing a processing flow in a spline curve deciding section in the numerical control apparatus according to the present invention.

Next, a description is made for a processing in the spline curve deciding section 2 with reference to FIG. 4.

When data is inputted from the instruction input section 1 to the spline curve deciding section 2 (Step 2 in FIG. 5), the processing flow shown in FIG. 4 is started. At first in step S201, if j is equal to 4 (j=4), coordinate values $P_1$, $P_2$, $P_3$, and $P_4$ for instructed points, distances between each instructed points $c_2$, $c_3$, $c_4$, and unit vectors $u_2$, $u_3$, $u_4$ are inputted. If j is not less than 5 (j≧5), a coordinate value $P_j$, a distance $c_j$ between instructed points, and unit vector $u_j$ are inputted.

Then in step S202, whether j is equal to 4 (j=4) or not (whether a start point is included in the processing or not) is checked, and if j is equal to 4 (j=4), then in step S203, tangentical vector $q_2^{[1]}$ is obtained from the Expression (8) through the following Expression (12).

$$q_1^{[1]} = \frac{1}{c_3 + c_2}(c_2 u_3 + c_3 u_2) \qquad (12)$$

Furthermore, in step S204, a tangential vector $q_1^{[1]}$ for the start point $P_1$ is obtained from the Expression (9) through the following expression (13).

$$q_1^{[1]} = \frac{1}{2c_2}(3(P_2 - P_1) - c_2 q_2^{[1]}) \qquad (13)$$

Then in step S205, a tangential vector $q_{j-1}^{[1]}$ for an instructed point $P_{j-1}$ is obtained from the following Expression (14).

$$q_{j-1}^{[1]} = \frac{1}{c_j + c_{j-1}}(c_{j-1} u_j + c_j u_{j-1}) \qquad (14)$$

Then in step S206, a tangential vector $q_{j-2}^{[1]}$ for an instructed point $P_{j-2}$ is obtained from the following Expression (15).

$$q_{j-2}^{[2]} = \frac{1}{2(c_{j-1}+c_{j-2})} (3(c_{j-2}u_{j-1} + c_{j-1}u_{j-2}) - c_{j-1}q_{j-3}^{[1]} - c_{j-2}q_{j-1}^{[1]}) \quad (15)$$

Then in step S207, whether j is equal to 4 (j=4) or not (whether the processing includes a start point or not) is checked, and if j is equal to 4, a tangential vector $q_1^{[2]}$ for the start point $P_1$ is obtained from the following Expression (16).

$$q_1^{[2]} = \frac{1}{2c_2} (3(P_2-P_1) - c_2 q_2^{[2]}) \quad (16)$$

With the processing above, the tangential vectors $q_{j-3}^{[2]}$, $q_{j-2}^{[2]}$ for the pass points $P_{j-3}$, $P_{j-2}$ are decided, so that in step S209, a spline curve for a zone from $P_{j-3}$ to $P_{j-2}$ is decided. Namely, assuming the following expressions from the Expression (1):

$$K_0 = P_{j-3} \quad (17a)$$

$$K_1 = c_{j-2} \, q_{j-3}^{[2]} \quad (17b)$$

$$K_2 = 3(P_{j-2}-P_{j-3}) - 2c_{j-2} \, q_{j-3}^{[2]} - c_{j-2} \, q_{j-2}^{[2]} \quad (17c)$$

$$K_3 = 3(P_{j-3}-P_{j-2}) + c_{j-2} \, q_{j-3}^{[2]} + c_{j-2} \, q_{j-2}^{[2]} \quad (17d)$$

the spline curve P(t) for a zone from $P_{j-3}$ to $P_{j-2}$ is given through the following expression;

$$P(t) = K_3 t^3 + K_2 t^2 + K_1 t + K_0 \quad (0 \leq t \leq 1) \quad (18)$$

In step S210, whether j is equal to n (j=n) or not (whether $P_j$ is an end point or not) is checked, and if j is not equal to n, the processing is terminated, but if j is n (j=n) ($P_j$ is an end point), the following processing for an end point is executed.

At first in step S211, a tangential vector $q_n^{[1]}$ for the end point $P_n$ is obtained from the Expression (10) through the following Expression (19).

$$q_n^{[1]} = \frac{1}{2c_n} (3(P_n-P_{n-1}) - c_n q_{n-1}^{[1]}) \quad (19)$$

Then in step S212, a tangential vector $q_{n-1}^{[2]}$ for the instructed point $P_{n-1}$ is obtained through the following Expression (20).

$$q_{n-1}^{[2]} = \frac{1}{2(c_n+c_{n-1})} (3(c_{n-1}u_n + c_n u_{n-1}) - c_n q_{n-2}^{[2]} - c_{n-1}q_n^{[2]}) \quad (20)$$

Then in step S213, a spline curve P(t) for a zone from $P_{j-3}$ to $P_{j-2}$ is obtained from the Expression (18) by substituting n+1 for j in the Expressions (17a) to (17d).

Finally, a spline curve for the final zone from $P_{n-1}$ to $P_n$ is obtained. In step S214, a tangential vector $q_n^{[2]}$ for the end point $P_n$ is obtained from the Expression (10) through the following Expression (21).

$$q_n^{[2]} = \frac{1}{2c_n} (3(P_n-P_{n-1}) - c_n q_{n-1}^{[2]}) \quad (21)$$

Then in step S213, a spline curve P(t) for a zone from $P_{j-3}$ to $P_{j-2}$ is obtained through the expression (18) by substituting n+2 for j in the Expressions (17a) to (17d).

Figure 5:
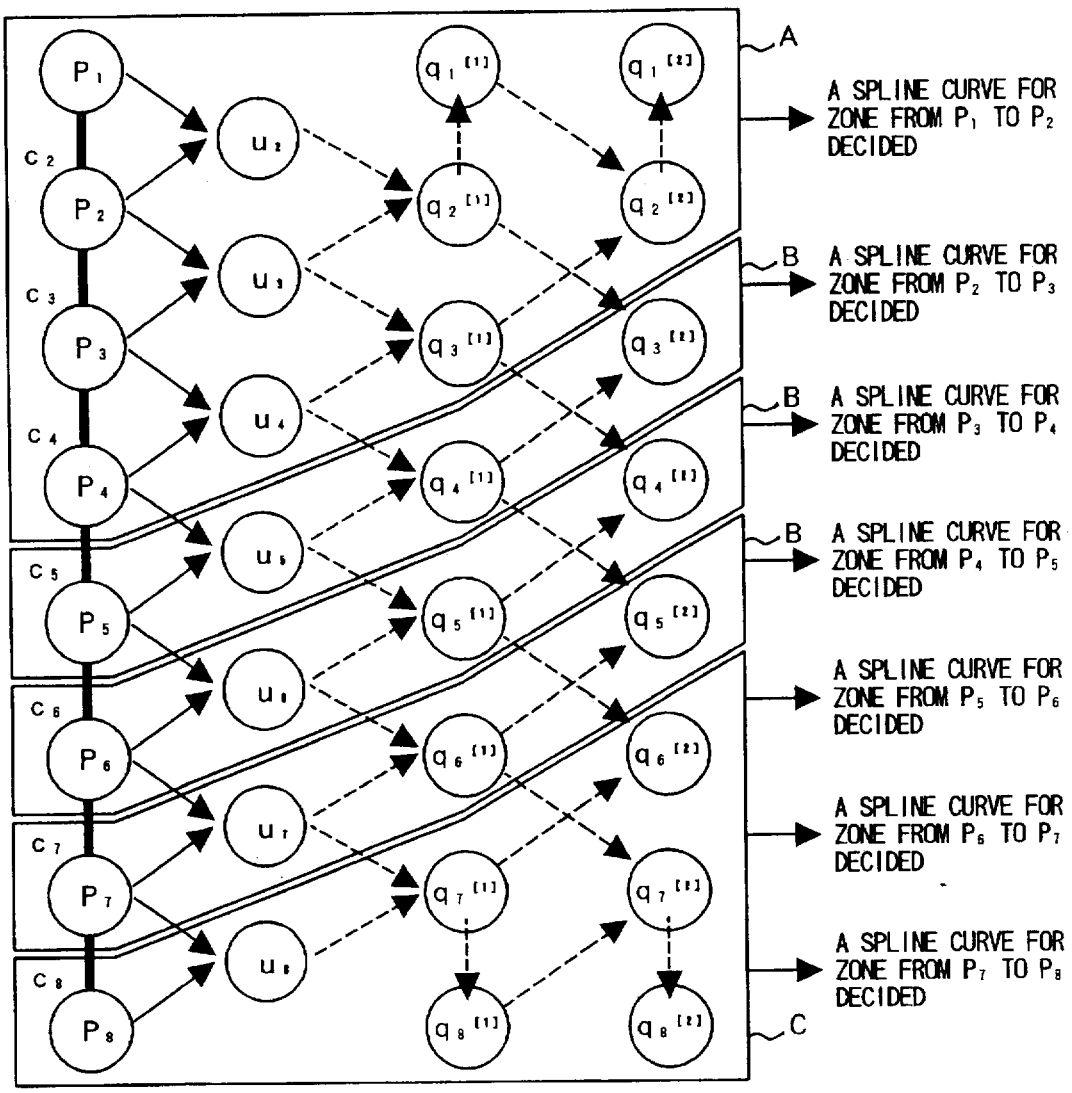
FIG. 5 is a concept diagram indicating a spline curve in each zone being obtained successively in the numerical control apparatus according to the present invention.

As clearly understood from the processing flows shown in FIG. 3 and FIG. 4, at a point of time when the instruction input section 1 has inputted 4 points $P_1$, $P_2$, $P_1$ and $P_4$ including a start point, the spline curve deciding section 2 decides a spline curve for a zone from $P_1$ to $P_2$ (A in FIG. 5). Then, each time a new instructed point $P_j$ (j>4) is inputted, a spline curve for a zone from $P_{j-3}$ to $P_{j-2}$ is decided (B in FIG. 5). The spline curves for three zones from $P_{n-3}$ to $P_{n-2}$, from $P_{n-2}$ to $P_{n-1}$, and from $P_{n-1}$ to $P_n$ are decided (C in FIG. 5. A case where n is equal to 8).

Next, a description is made for contents of a processing by the speed control means 3 shown in FIG. 1.

An object is for controlling movement of a tool by specifying a maximum speed instruction value $F_0$ along the spline curve decided by the spline curve deciding section 2, but if a radius of curvature of a curve is small, sometimes an excessive acceleration exceeding an allowable value for the machine may work in the direction of normal to the curve.

In the speed control means 3, a speed instruction value is restricted so that an acceleration in the direction of normal to a spline curve for each zone will not exceed an allowable value for the machine.

A positional vector for the spline curve decided in the spline curve deciding section 2 is given through the Expression (18) above.

For this reason, a speed vector $V_j(t)$ and an acceleration vector $a_j(t)$ each differentiated with a curve parameter t are expressed by the following expressions;

$$v(t) = P'(t) = 3K_3 t^2 + 2K_2 t + K_1 \quad (22)$$

$$a(t) = P''(t) = 6K_3 t + 2K_2 \quad (23)$$

Figure 6:
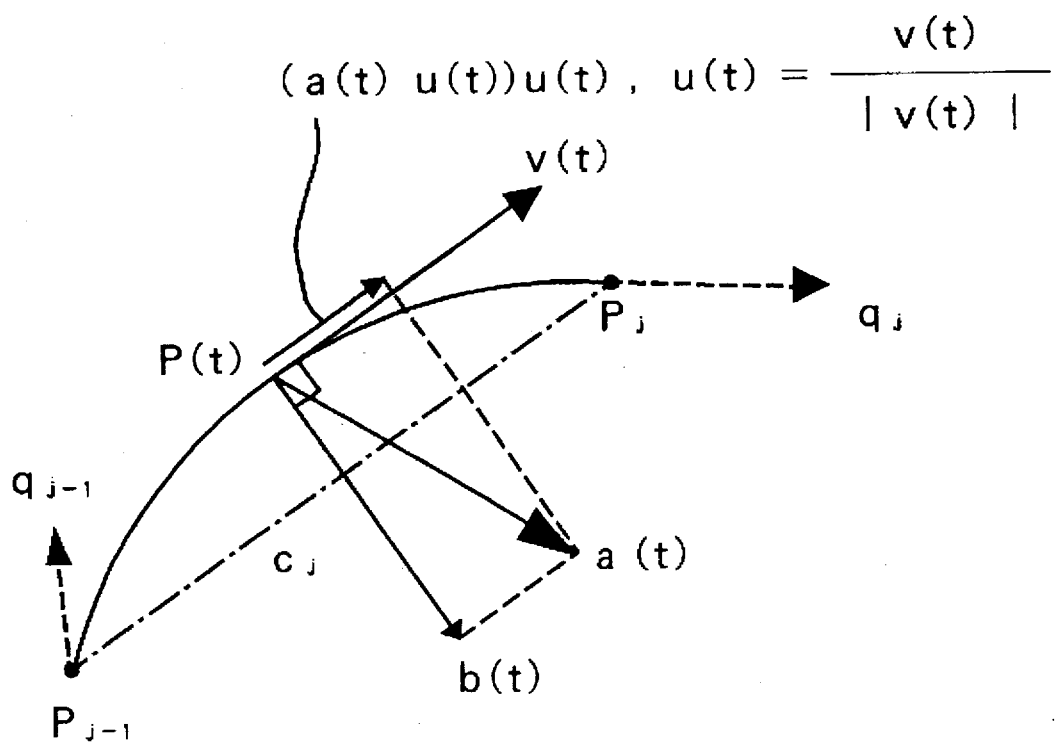
FIG. 6 is an explanatory view showing a relation among tangential vector, acceleration vector, and normal vector of a point on a spline curve.

Herein assuming that a unit vector $u_j(t)$ in the tangential direction is as expressed by the following expression;

$$u(t) = \frac{v(t)}{|v(t)|} \quad (24)$$

the acceleration vector b(t) in the tangential direction is given by the following expression;

$$b(t) = a(t) - (a(t)u(t))u(t) \quad (25)$$

as shown in FIG. 6.

For this reason, a curvature κ(t) and radius of curvature ρ(t) are as expressed by the following expression;

$$\kappa(t) = \frac{1}{\rho(t)} = \frac{|b(t)|}{|v(t)|^2} \quad (26)$$

so that a magnitude of an acceleration α(t) in the normal direction when moving on a curve at a speed F is given by the following expression:

$$\alpha(t) = \kappa(t) F^2 \quad (27)$$

For this reason, assuming that a maximum value of the curvature κ(t) is $\kappa_{max}$, a feed speed $F_{max}$ not exceeding the allowable acceleration α in all zones of the curve is obtained through the Expression (27);

$$F_{max} = \sqrt{\frac{\alpha}{\kappa_{max}}} \quad (28)$$

As understood from the Expression (26), a curvature of a spline curve is not constant in one block, and takes a different value according to a position within the block, namely according to a curve parameter. In order to obtain a speed with a normal acceleration of not more than an allowable value at all instructed point, it is necessary to know a maximum value of a curvature within a curve zone. The maximum value of curvature is estimated as described below.

When a change of v(t) within one block is small, a(t) becomes maximum at an edge point of a curve zone (t=0 or 1). So it is assumed that a maximum value of curvature is a value at the edge point. Furthermore, at an edge point, an acceleration at an edge point is substantially equal to the normal acceleration, a(t) and v(t) are substantially perpendicular to each other (a term for internal product in the Expression (25) is almost zero), so that acceleration a(t) is used in place of the normal acceleration b(t) in the Expression (25). Namely, a maximum value $\kappa_{max}$ of curvature is estimated through the following Expression (29).

$$\kappa_{max} = \max(\kappa'(0), \kappa'(1)) \tag{29}$$

$$\kappa'(t) = \frac{|a(t)|}{|v(t)|^2} \tag{30}$$

Figure 7:
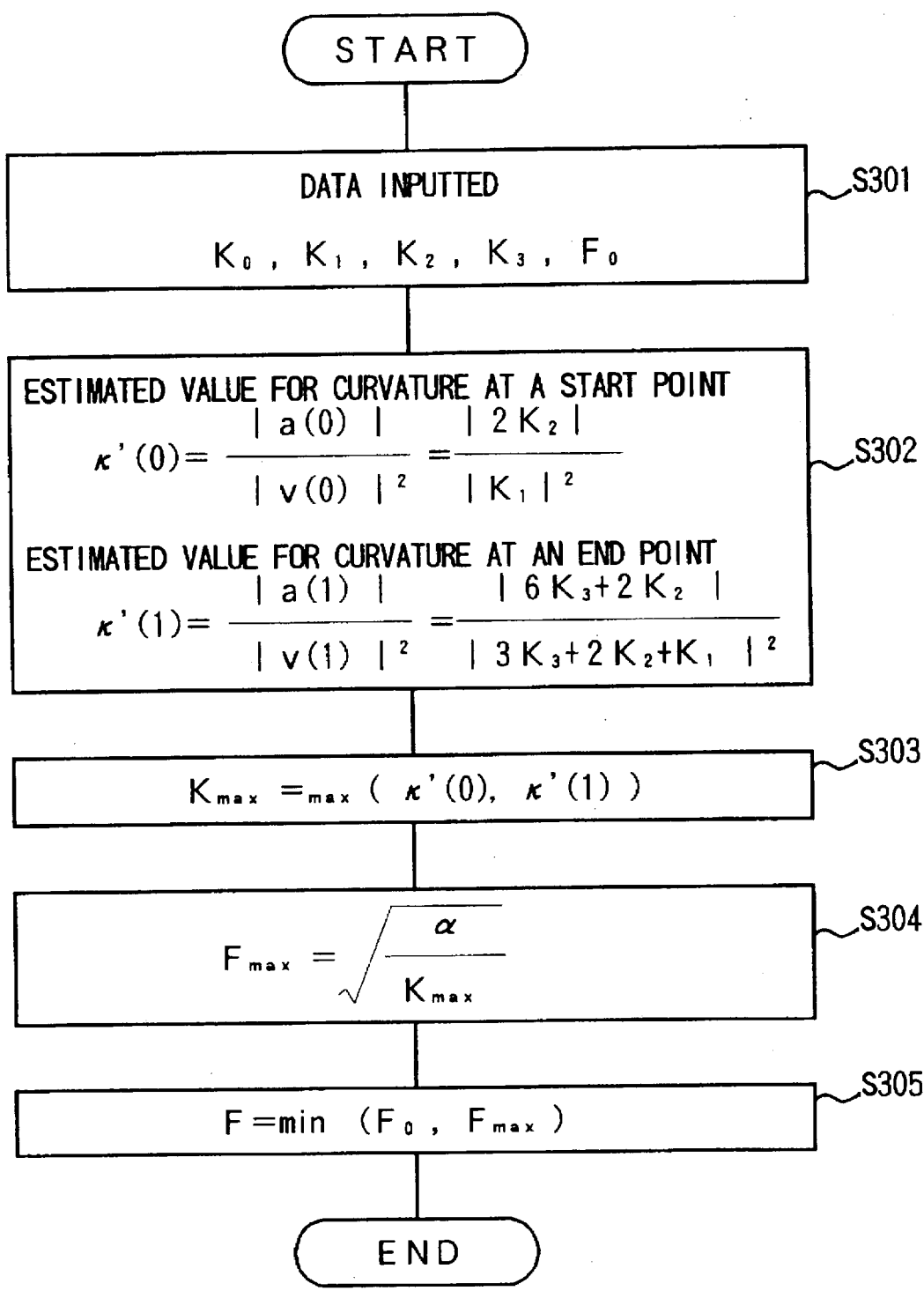
FIG. 7 is a flow chart showing a processing flow in a speed control section in the numerical control apparatus according to the present invention.

FIG. 7 shows a processing flow in the speed control section 3.

At first in step S301, spline coefficients $K_3$, $K_2$, $K_1$, $K_0$ are inputted from the spline curve deciding section 2, and a maximum speed instruction value $F_0$ is inputted from the instruction input section 1.

Then in step S302, an estimated value $\kappa'(0)$ for curvature at a start point and an estimated value for curvature $\kappa'(1)$ are obtained from the following Expressions (31) and (32), according to the Expressions (22), (23), and (30).

$$\kappa'(0) = \frac{|a(0)|}{|v(0)|^2} = \frac{|2K_2|}{|K_1|^2} \tag{31}$$

$$\kappa'(1) = \frac{|a(1)|}{|v(1)|^2} = \frac{|6K_3 + 2K_2|}{|3K_3 + 2K_2 + K_1|^2} \tag{32}$$

Then in step S303, $\kappa$maxis obtained from the Expression (29), and furthermore in step S304, a feed speed $F_{max}$ not exceeding the allowable acceleration $\alpha$ is computed through the Expression (28).

Finally in step S305, the maximum speed instruction values $F_0$ and $F_{max}$ are computed through the Expression (33) below, and a smaller one of the two values is used as a feed speed instruction value F.

$$F = \min (F_0, F_{max}) \tag{33}$$

With the processing processes described above, a feed speed instruction value F not exceeding the normal acceleration can be obtained within one spline curve zone and also within the maximum speed instruction value.

Figure 8:
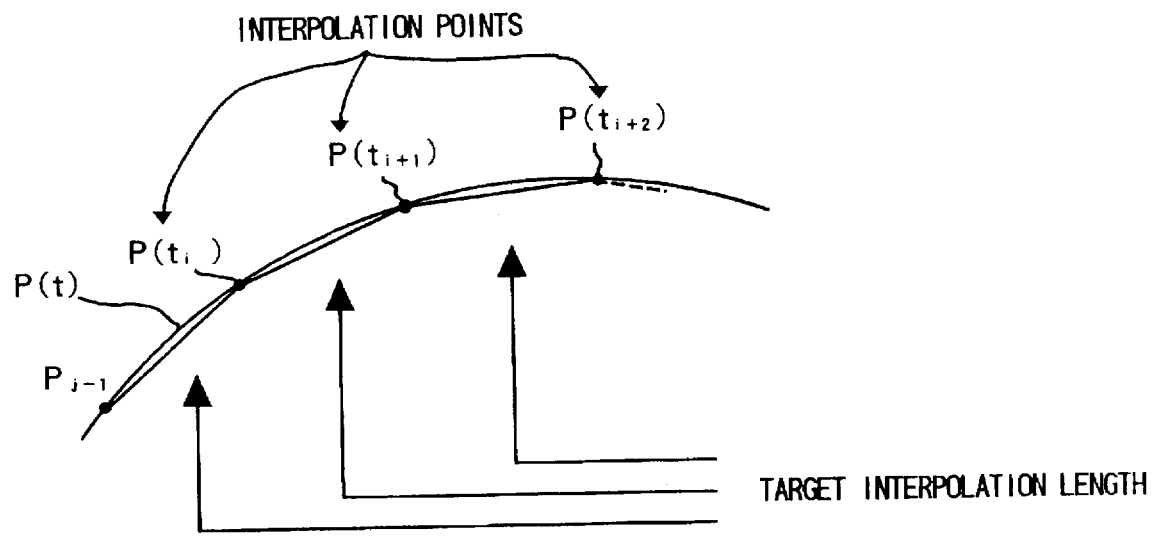
FIG. 8 is an explanatory view showing an interpolating point on a spline curve.

Next, a description is made for a processing in the interpolation computing section 4. In the interpolation computing section 4, on the spline curve inputted from the spline curve deciding section 2, a point (interpolation point) where a length from the current point is, as shown in FIG. 8, a specified interpolation length (target interpolation length) is obtained in each interpolation cycle (interpolation time) $\Delta T$ according to a speed instruction value F inputted from the speed control section 3, and a coordinate value for the point is outputted to the servo driving section 5.

As the interpolation point as described above can not be obtained accurately, the interpolation point is obtained by repeatedly computing according to the operating sequence below using a change rate of a curve parameter near the interpolation point.

The target interpolation strength leng in an interpolation cycle $\Delta T$ based on the instructed feed speed F is as expressed by the following expression;

$$\text{leng} = F \times \Delta T \tag{34}$$

Herein a case is assumed where P $(t_{i+1})$ having moved by the interpolation length leng from the point $P(t_i)$ on the spline curve for the current parameter t $(=t_i)$ is obtained. (Process 1)

It is assumed that an interpolation point one cycle before is $P(t_{i-1})$. A parameter change $\Delta t_i$ and a distance of movement $L_i$ are defined as follows;

$$\Delta t_i = t_i - t_{i-1} \tag{35}$$

$$\Delta L_i = |P(t_i) - P(t_{i-1})| \tag{36}$$

and a parameter $t_{i+1}$ for the target point $P(t_{i+1})$ is temporarily decided as follows.

$$t_{i+1} = t_i + \frac{\Delta t_i}{\Delta L_i} \times \text{leng} \tag{37}$$

(Process 2)

Position $P(t_{i+1})$ for an interpolation point is computed from the $t_{i+1}$ temporarily decided as described above.

(Process 3)

Figure 9:
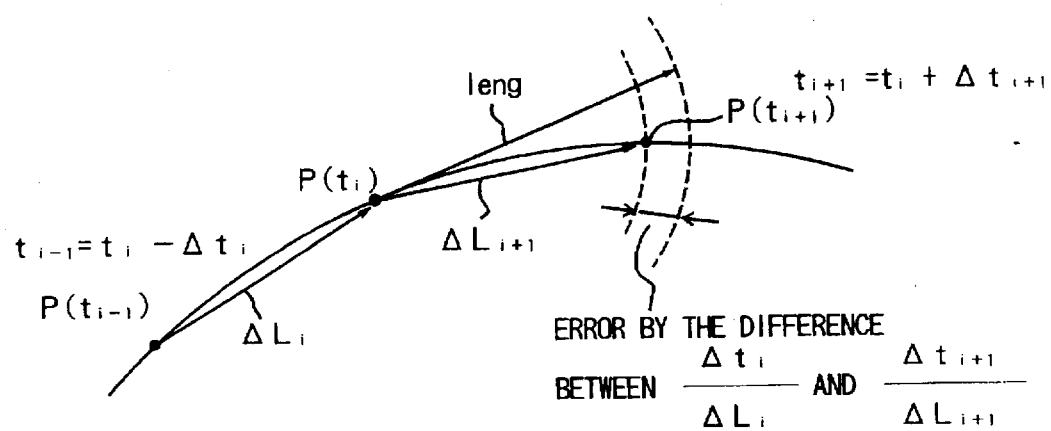
FIG. 9 is an explanatory view showing a method of obtaining an interpolating point after a unit of time thereof on a spline curve.

$P(t_{i+1})$ decides the parameter $t_{i+1}$ as described above so that the amount of movement from $P(t_i)$ will be equal to the interpolation length leng, but as a ratio of amount of movement vs parameter change changes according to a position on the curve, the actual amount of movement is different from the target interpolation length as shown in FIG. 9. So a ratio of parameter change vs amount of movement is corrected according to the actual amount of movement $\Delta L_{i+1}$ ($= |P(t_{i+1}) - P(t_i)|$) against the actual parameter change $\Delta t_{i+1}$ ($= t_{i+1} - t_i$), and a parameter $t_{i+1}$ for the target point $P(t_{i+1})$ is again obtained through the Expression (38).

$$t_{i+1} = t_i + \frac{\Delta t_{i+1}}{\Delta L_{i+1}} \times \text{leng} \tag{38}$$

By repeating the above processes 2 and 3, it is possible to accurately set a parameter corresponding to a target amount of movement.

Figure 10:
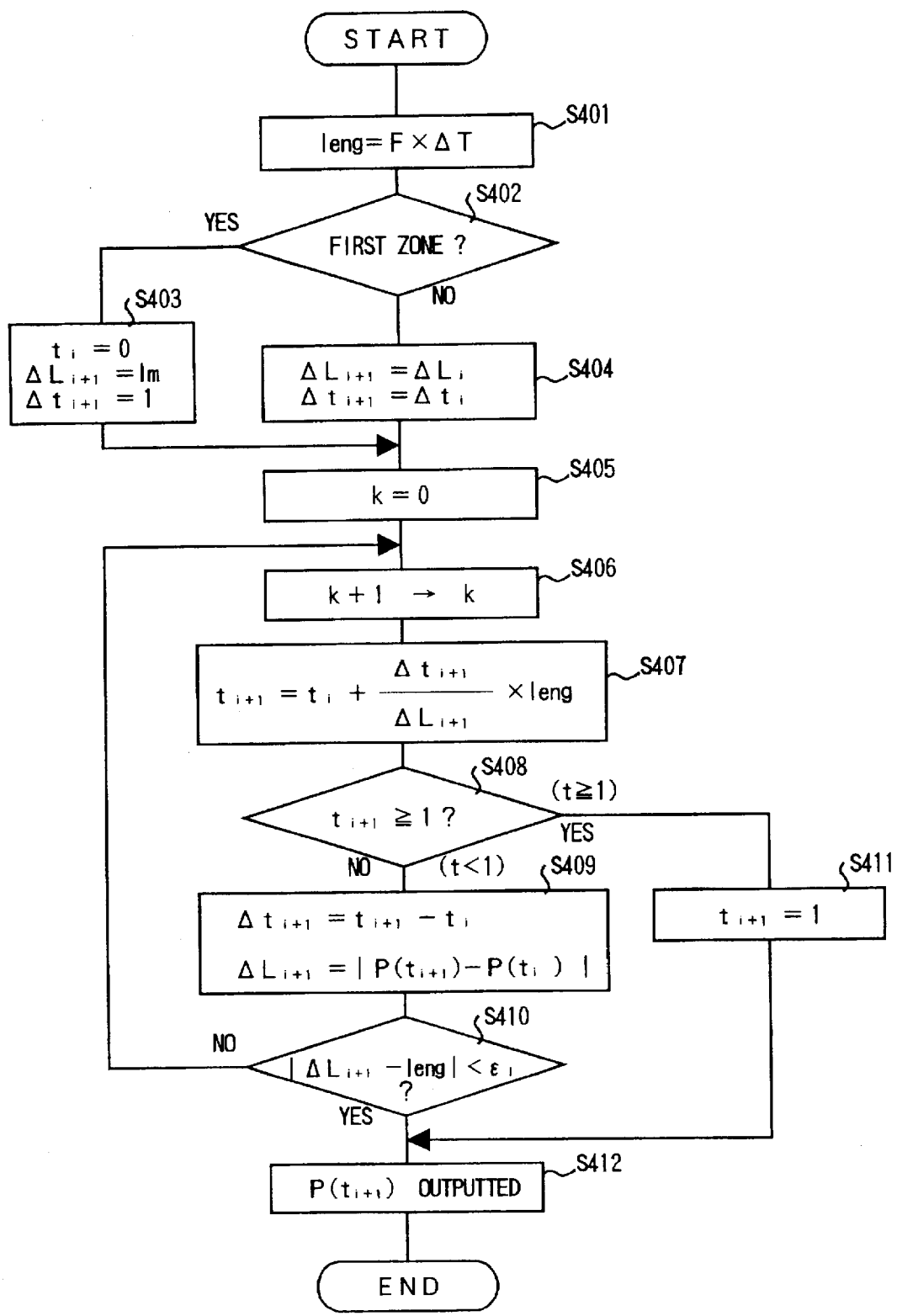
FIG. 10 is a flow chart showing a processing flow in an interpolation computing section in the numerical control apparatus according to the present invention.

FIG. 10 shows a processing flow in the interpolation computing section 4 according to the computing principle described above.

At first in step S401, a target interpolation length leng= $F \times \Delta T$ is obtained from an instructed feed speed F and an interpolation cycle $\Delta T$.

Then in step S402, whether machining tool entered the spline curve zone for the first time or not is checked, and if interpolation has been executed on the spline curve, in step S404, using the parameter change rate $\Delta t_i$ and amount of movement $L_i$ used in the Expressions (35), (36), the conditions as expressed by the following expressions are assumed;

$$\Delta t_{i+1} = \Delta t_i \tag{39}$$

$$\Delta L_{i+1} = \Delta L_i \tag{40}$$

In contrast, if a processing is executed for the first time in the current spline curve, a change rate of a past parameter can not be made use of, and if a block length of lm is used in step S403, amount of movement of lm is achieved in a period while the parameter t changes from 0 to 1, so that, if the conditions as expressed by the following expressions are assumed:

$$\Delta t_{i+1} = 1 \tag{41}$$

$$\Delta L_{i+1} = \text{lm} \tag{42}$$

then $t_i$ becomes equal to 0.

Then in step S405, time of repetition k is initialized to 0 (k=0), in step S406, K+1 is changed to k.

In step S407, a parameter $t_{i+1}$ is obtained through the following expression.

$$t_{i+1} = t_i + \frac{\Delta t_{i+1}}{\Delta L_{i+1}} \times \text{leng} \quad (43)$$

Then in step S408, whether the obtained parameter $t_{i+1}$ is larger than 1 or not is checked, and if $t_{i+1}$ is equal to or larger than 1 ($t_{i+1} \geq 1$), in step S411, $t_{i+1}$ is set to 1, and an end point P(1) of the block is regarded as a target point.

In contrast, if $t_{i+1}$ is smaller than 1 ($t_{i+1}<1$), in step S409, the actual amount of movement $\Delta L_{i+1}$ and parameter change rate $\Delta t_{i+1}$ are computed through the expressions similar to the Expressions (35) and (36) above.

Then in step S410, an error between the actual amount of movement $L_{i+1}$ and a target interpolation distance leng ($|\Delta L_{i+1}|$–lengl) is evaluated, and if the error is larger than an allowable value $\epsilon_1$, in step S406 the processing is repeated by looping to step S406.

By means of this repeated loop, a ratio of amount of movement vs parameter change rate ($\Delta t_{i+1}/\Delta L_{i+1}$) in step S407 is corrected, and the parameter $t_{i+1}$ is updated so that the amount of movement $\Delta L_{i+1}$ will get closer to the parameter $t_{i+1}$.

In step S410, if ($|\Delta L_{i+1}|$–lengl) is smaller than $\epsilon_1$, the parameter $t_{i+1}$ at this point of time is regarded as a parameter for the current interpolation cycle giving the target interpolation length leng, and in step S412, the coordinate value P ($t_{i+1}$) is outputted to the servo driving section 5, and then the processing is terminated.

The processes above include an operation for determination of convergence, but practically an adequate precision can be obtained by repeating the processing sequence once or twice. For this reason, a target interpolation point can be computed at a high speed within the interpolation cycle $\Delta T$.

FIG. 11 shows Embodiment 2 of a key section of a numerical control apparatus according to the present invention. It should be noted that, in FIG. 11, the same reference numerals are assigned to the same sections as corresponding sections in FIG. 1 and the description thereof is omitted herein.

In this embodiment, an allowable error $\epsilon$ is given in place of an allowable acceleration to the speed control section 3, which computes an interpolated speed F keeping this allowable error $\epsilon$.

Figure 12:
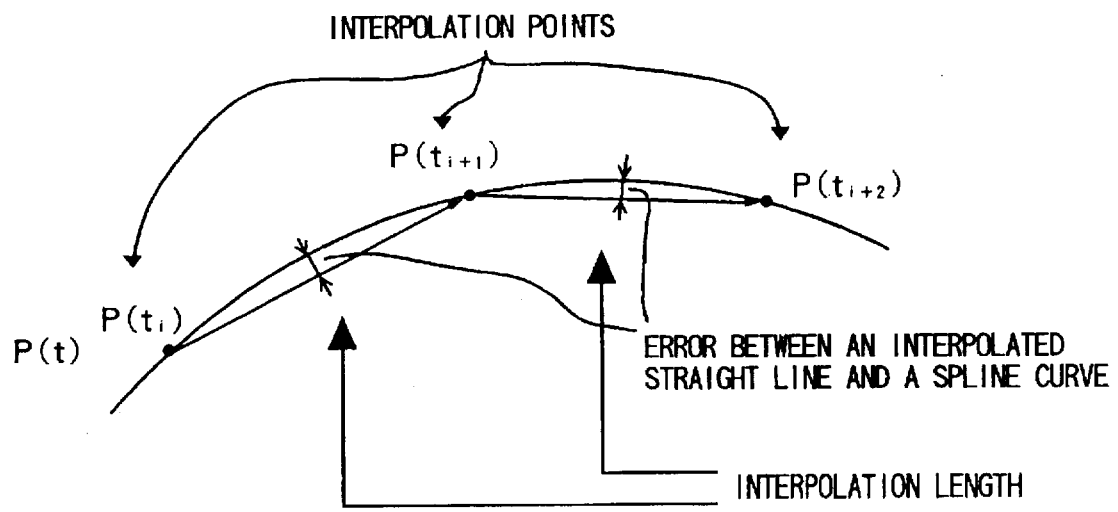
FIG. 12 is an explanatory view showing an error between a curve and a straight line when interpolation is executed by a straight line on the spline curve.

Also in this embodiment, movement of a machining tool is controlled according to the maximum speed instruction value $F_0$ along the spline curve decided in the spline curve deciding section 2, but in the interpolation computing section 4, which in the later stage of the processing, an interpolation point is specified in each interpolation cycle $\Delta T$, and a machining tool is linearly moved between the interpolation points, so that, if a radius of curvature of a spline curve is small, as shown in FIG. 12, sometimes a positional error exceeding an allowable error may be generated between an interpolated straight line and a curve.

The speed control means 3 restricts a speed instruction value so that an error between an interpolated straight line and a spline curve in a zone will not exceeds the allowable value $\epsilon$.

Figure 13:
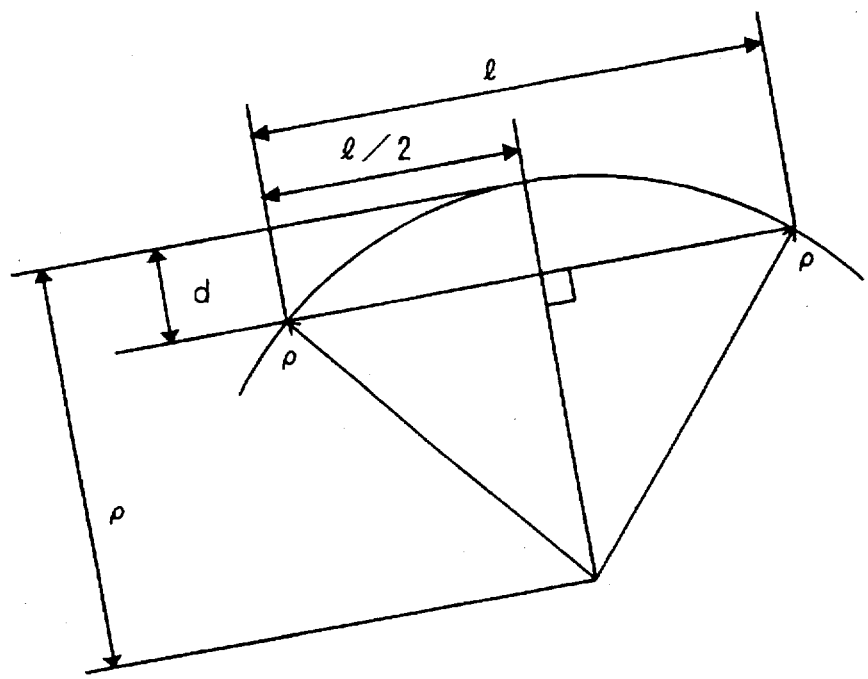
FIG. 13 is an explanatory view for obtaining geometrically a distance between a chord stretched on a curve with a constant radius of curvature and a curve.

When a string with a length I is spanned over a curve with the radius of curvature of $\rho$, the maximum distance d between this string and the curve is given, as shown in FIG. 13, from the following expression;

$$d = \rho - \sqrt{\rho^2 - \left(\frac{1}{2}\right)^2} \quad (44)$$

For this reason, the maximum value $I_{max}$ of the string length in which an error in the case where a curve is approximated with a string is not more than $\epsilon$ is given through the following Expression (45).

$$I_{max} = 2\sqrt{\epsilon(2\rho - \epsilon)} \quad (45)$$

So in a case where a spline curve with the minimum radius of curvature $\rho_{min}$ (maximum curvature $\kappa$) is interpolated in an interpolation cycle $\Delta T$ and assuming an allowable errors, it may be assumed that the interpolated distance is $I_{max}$ obtained through the Expression (45), the feed speed $F_{max}$ then is as expressed by the following expression.

$$F_{max} = I_{max}/\Delta T = \frac{2\sqrt{\epsilon(2\rho_{min} - \epsilon)}}{\Delta T} = \frac{2\sqrt{\epsilon(2/\kappa_{max} - \epsilon)}}{\Delta T} \quad (46)$$

Figure 14:
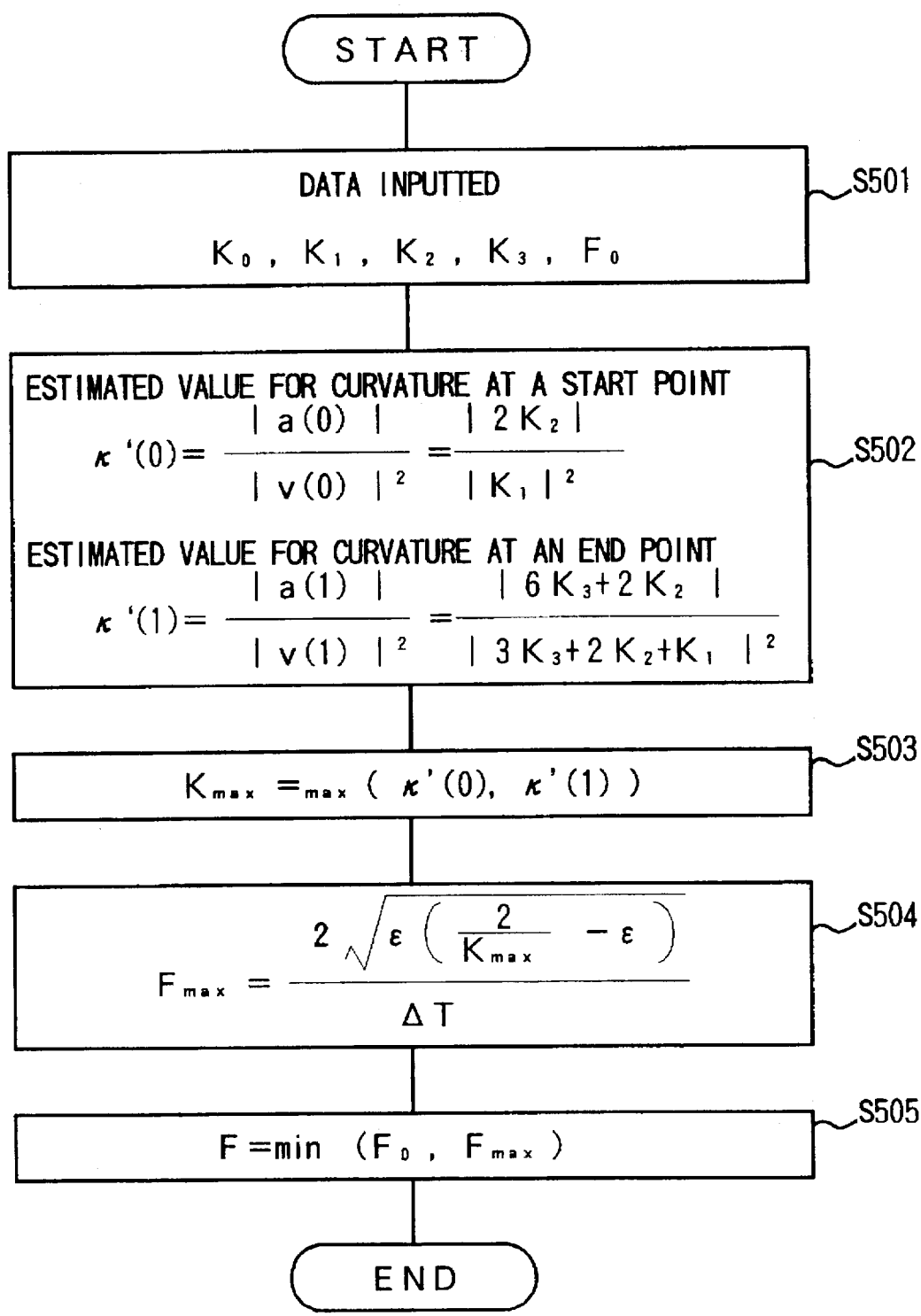
FIG. 14 is a flow chart showing a processing flow in the speed control section in the numerical control apparatus according to the present invention.

FIG. 14 shows a processing flow in the speed control section 3 in Embodiment 2 of the present invention.

Steps S501, S502, S503 are the same as the steps S301, S302, and S303 shown in FIG. 9 (the processing flow in the speed control section 3 in Embodiment 1) respectively, and in step S503, the maximum curvature $\kappa_{max}$ for a spline curve zone is obtained, and in step S504, a feed speed $F_{max}$ not exceeding the allowable error $\epsilon$ is computed through the Expression (46) above.

Finally in step S305, either smaller one of the maximum speed instruction value $F_0$ and $F_{max}$ is used as a feed speed instruction value F in the following expression.

$$F = \min(F_0, F_{max}) \quad (47)$$

Through the processing sequence as described above, a speed instruction value F with an interpolation error not exceeding an allowable error can be obtained within a maximum speed instruction value in one spline curve zone.

Embodiment 3

Figure 15:
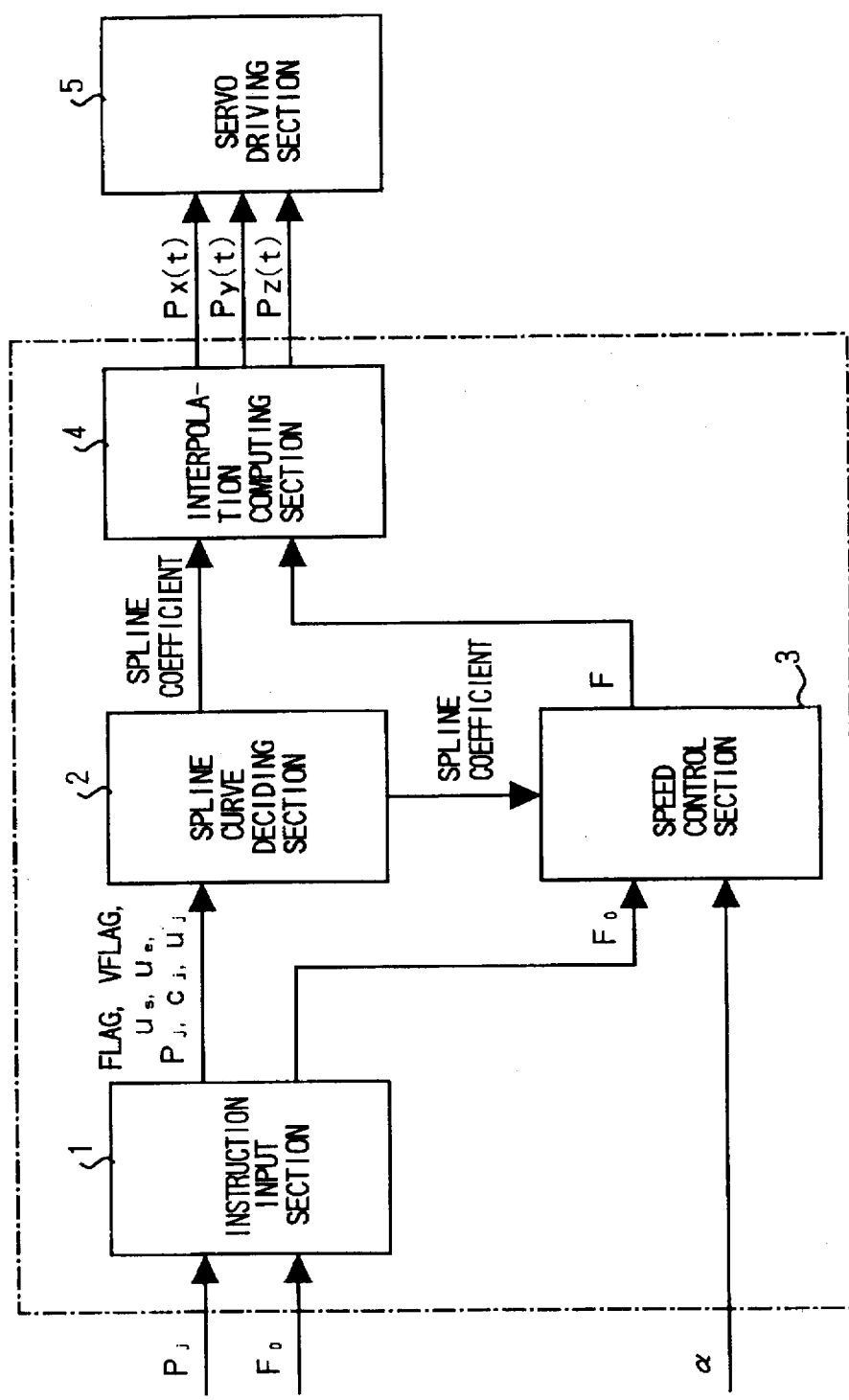
FIG. 15 is a block diagram showing key configuration of Embodiment 3 of the numerical control apparatus according to the present invention.

FIG. 15 shows Embodiment 3 of a key section of a numerical control apparatus according to an embodiment of the present invention. It should be noted that the same reference numerals are assigned to the same section as corresponding sections shown in FIG. 1, and description thereof is omitted herein.

In this embodiment, the instruction input section 1 fetches instructed point array $P_j$ (j=1,2, ..., n) on the curve path and the maximum speed instructed value $F_0$ like in a case according to Embodiment 1, and outputs, in addition to the instructed point array $P_j$, distance $c_j$ between adjoining instructed points, unit vector $u_j$, identification flags FLAG and VFLAG by recognizing a portion which is a straight line zone in the pass point array $P_j$ (i=1,2, ..., n). If the straight line zone exists before or after the start point or end point, then unit vectors $u_s$ and $u_e$ of the straight line are outputted.

The data as described above is given from the instruction input section 1 to the spline curve deciding section 2, which generates data for a straight line section as well as for a spline curve section smoothly connecting thereto (spline coefficient).

Figure 16A:
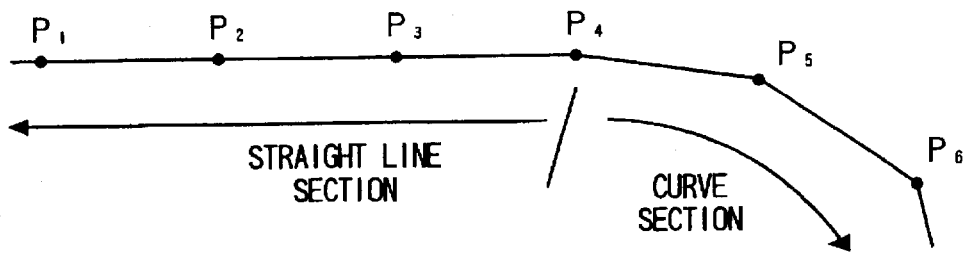
FIG. 16A to FIG. 16C are explanatory views each for explanation of distortion of a shape normally generated on a straight line section when a straight line section is present on an array of pass points constituting a spline curve and of a shape avoided from its distortion according to the present invention.
Figure 16B:
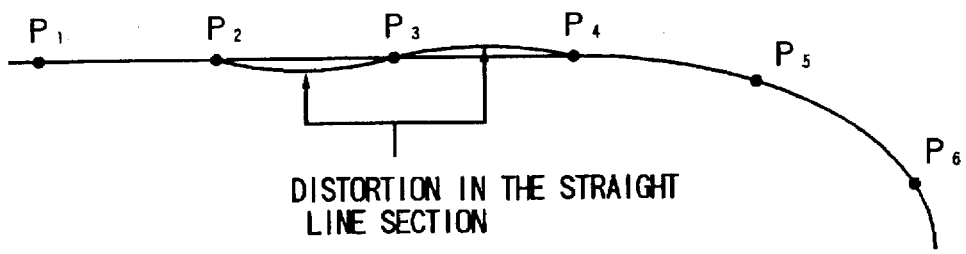
Figure 16C:
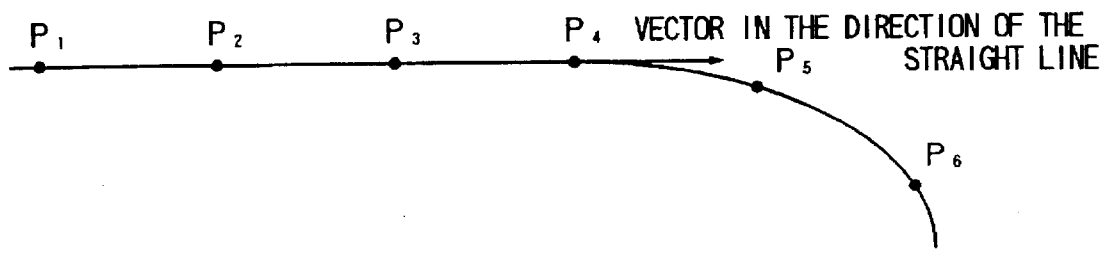

Generally, if there is a straight line section, in which a progressing direction of the point array is continuously equal, in the pass point array $P_j$ (j=1,2, ..., n) forming a spline curve as shown in FIG. 16A, it does not occur that the spline curve becomes a straight line because the straight line section is affected by a curve section succeeding thereto, and rather distortion is generated.

In this invention, the following sections are recognized as a straight line section;

(1) a section where 2 or more blocks from a start point of a point array face the same direction, (2) a section where 2 or more blocks up to an end point of a point array face the same direction, (3) a section which exists in an intermediate section of a point array and in which 3 or more blocks face the same direction, and a start point, an end point, and an array of points included in these straight line sections are regarded as a point array forming a spline curve. Tangential vectors for the start point $P_1$ and end point $P_n$ of a point array forming a spline curve are computed, when there is no straight line portion before the start point nor after the end point, through the following expressions assuming that the curvature at the end point is 0 as expressed by the Expressions (9) and (10) in Embodiment 1;

In contrast, assuming a unit vector indicating, when there is a straight line section before the start point, direction of the straight line as $u_s$, or a unit vector indicating, when there is a straight line after the end point, direction of the straight line as $u_e$, the tangential vectors $q_1^{[k+1]}$ and $q_n^{[k+1]}$ for a start point and an end point respectively are obtained through the Expressions (3a), (3b)

$$q_1^{[k+1]} = u_s \tag{48a}$$

$$q_n^{[k+1]} = u_e \tag{48b}$$

Next, a description is made for contents of computing in the instruction input section 1 as well as in the spline curve deciding section 2 with reference to the principle of deducing a spline curve described above.

Figure 17:
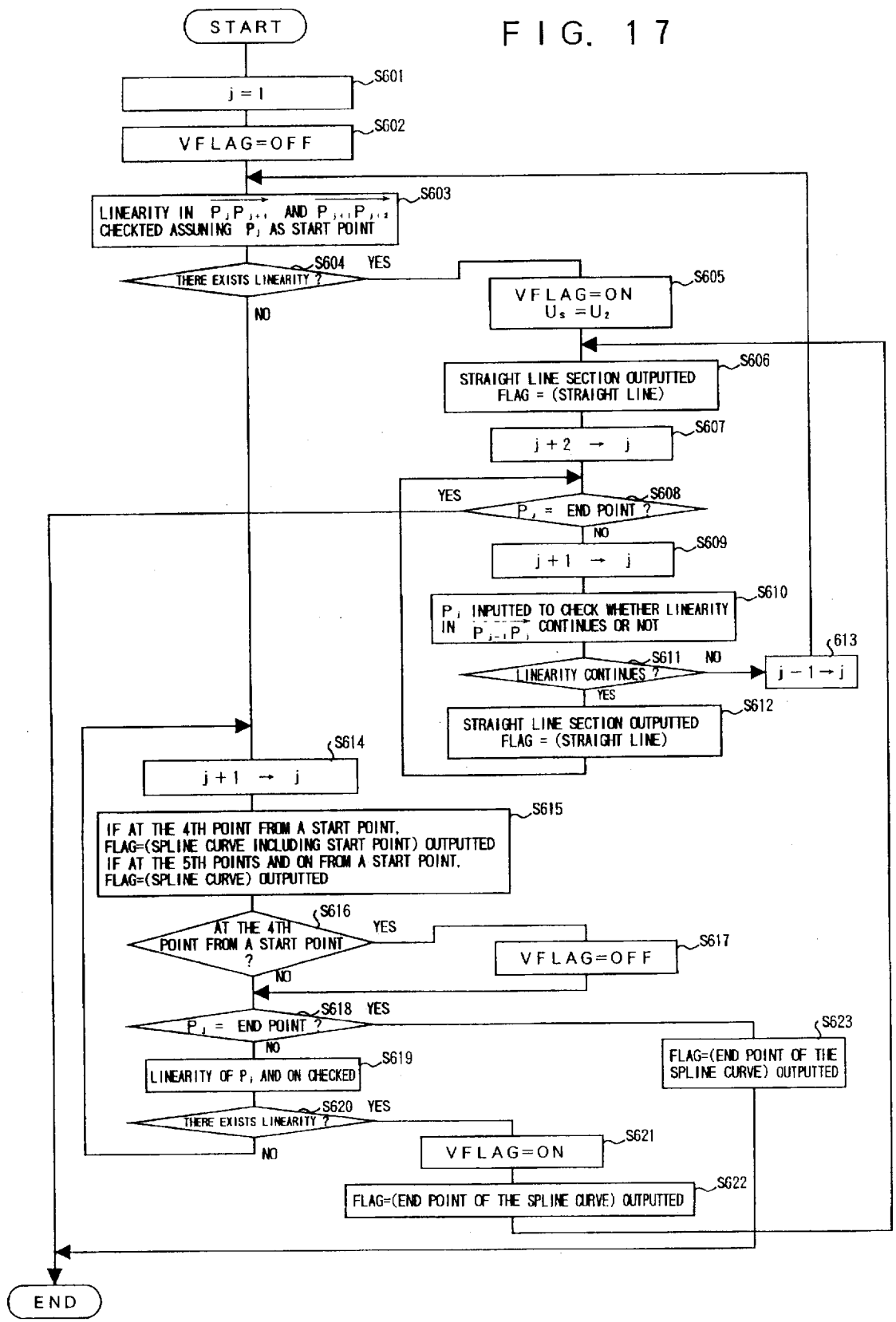
FIG. 17 is a flow chart showing a processing flow in the instruction input section differentiating a straight line section.

FIG. 17 shows a general flow of processing in the instruction input section 1, and when an instruction for spline interpolation is inputted into the instruction input section 1, this processing flow is started.

At first, in step S601, j is initialized to 1, and in step S602, the flag VFLAG indicating existence of a straight line section is initialized to OFF. The flag VLAG indicates that there is no straight line section when it is OFF, and that there is a straight section when it is ON.

In step S603, coordinate values for the three instructed points $P_1$, $P_2$, $P_3$ from the start point are inputted, then a distance $c_2$ from the instructed point $P_1$ to instructed point $P_2$ and a distance $c_3$ from the instructed point $P_2$ to instructed point $P_3$ are obtained, and the respective unit vectors $u_2$ and $u_3$ are obtained through the Expression (7). Then $u_2$ is compared to $u_3$ to check the linearity.

When $u_2$ is equal to $u_3$, in step S604, it is determined that there exists linearity, then system control goes to step S605, the flag VFLAG is turned ON, and the unit vector $u_s$ indicating a direction of the straight line is set to $u_2$.

In contrast, if $u_2$ is not equal to $u_3$, it is determined that there exists no linearity, and system control goes to step S614. In this case, the flag VFLAG maintains the OFF state.

When system control goes to step S605, then in step S606, the identifying flag FLAG is set to FLAG (=straight line), and a start point $P_1$, an end point $P_2$, a distance $c_2$, a unit vector $u_2$ (a zone from $P_1$ to $P_2$), as well as a start point $P_2$, an end point $P_3$, a distance $c_3$, a unit vector $u_3$ (a zone from $P_2$ to $P_3$) are outputted to the spline curve deciding section 2 respectively.

Then in step S607, j+2 is updated to j (currently j is equal to 3 (j=3)). In step S608, whether the instructed point $P_j$ is an end point or not is checked, and if the instructed point $P_j$ is an end point, the processing is terminated, and if the instructed point $P_j$ is not an end point, system control goes to step S609 and subsequent steps.

In step S609, j+1 is updated to j, and in step S610, a coordinate value for the instructed value $P_j$ is inputted, and a distance $c_j$ from the instructed point $P_{j-1}$ up to the instructed point $P_j$, and a unit vector $u_j$ are obtained. Then in step S611, whether the unit vector $u_j$ is equal to the unit vector $u_s$ indicating a direction of the straight line up to the point is checked, and whether there exists linearity or not is checked according to a result of the determination above.

In step S611, if $u_j$ is equal to $u_s$, it is determined that linearity continues, and system control goes to step S612, the identifying flag FLAG is set to FLAG (=straight line), and the start point $P_{j-1}$, end point $P_j$, distance $c_j$, unit vector $u_j$ (a zone from $P_{j-1}$ to $P_j$) are outputted to the spline curve deciding section 2, and then system control loops to step S608.

In the processing above, by looping step S608 and subsequent processes, zones, in each of which 2 or more blocks from a start point of the point array faces the same direction, are extracted, and as long as zones facing the same direction continues, each block is regarded as a straight line zone and is outputted to the spline curve deciding section 2.

In the loop, in step S611, if $u_j$ is not equal to $u_s$, in step S613 j−1 is updated to j, and system control loops to step S603, and extraction of a straight line section is again executed assuming the instructed point $P_j$ as a start point In determination in step S604, if it is determined that there exists no linearity (when $u_{j+1}$ is not equal to $u_{j+2}$), system control shifts to processing of a spline curve section in step S614 and on.

In step S614, j+1 is updated to j, and in step 615, output processing for the spline curve section is executed. In the loop from step S614 up to step S620, instructed points each constituting a spline curve are sequentially inputted, but in step 615 data having the following contents is outputted to the spline curve deciding section 2.

(1) When the instructed point $P_j$ is a fourth point from a start point of the spline curve;

FLAG=(A spline curve including the start point)

Coordinates for the instructed points: $P_{j-3}$, $P_{j-2}$, $P_{j-1}$, and $P_j$ Distance between the instructed points: $c_{j-2}$, $c_{j-1}$, $c_j$ Unit vector between instructed points: $u_{j-2}$, $u_{j-1}$, $u_j$ VFLAG (ON/OFF): Tangential vector $u_s$ when VFLAG is ON.

(2) When the instructed point $P_j$ is a fifth point and on from a start point of the spline curve;

FLAG=(Spline curve)

Coordinate for the instructed point: $P_j$

Distance between instructed points: $c_j$

Unit vector between instructed points: $u_j$

In step S616, whether the instructed point $P_j$ is a fourth point from a start point of the spline curve or not is checked, and if so, or in other words, if a spline curve including a start point has been outputted in step S615, the flag VFLAG is turned OFF.

In step S618, whether the instructed point $P_j$ is an end point of an inputted point array or not is checked, and if the instructed point $P_j$ is an end point, FLAG=(End point of a spline curve) and VFLAG (=OFF) are outputted to the spline curve deciding section 2, and the processing is terminated.

If the instructed point $P_j$ is not an end point of an inputted point array, in step S619, linearity of the instructed point $P_j$ and on is checked. Herein up to three instructed points for $P_j$ and on are inputted, and when any of the conditions (1) or (2) below is satisfied, it is determined that there exists linearity.

(1) Unit vector $u_{j+1} = u_{j+2} = u_{j+3}$ (2) Unit vector $u_{j+1} = u_{j+2}$, and at the same time the instructed point $P_{j+2}$ is an end point of an inputted point array.

In step S620, whether there exists linearity on the instructed point $P_j$ and on or not is checked, and if there exists no linearity, system control loops to step S614, and output to the spline curve section is continued. In contrast, if there exists linearity, in step S621, the flag VFLAG is turned ON, and the unit vector $u_s$ indicating a direction of the straight line is set to $u_{j+1}$.

Then in step S622, the identifying flag FLAG=(End point of a spline curve), flag VFLAG (=ON), and tangential vector $u_s$ are outputted to the spline curve deciding section 2, and the processing is terminated. Then control system loops to step S606.

In step S606 and on, if the extracted straight line section extends up to the end point, in step S606 and step S612 all straight line blocks are outputted, in step S608 an end point is detected, and the processing is terminated. If the straight line section is discontinued on the way, and a curve section starts again, system control branched from step S611 to step S615, and in step S603 and on output processing for a new curve is executed.

Next, a description is made for contents of a processing in the spline curve deciding section 2 with reference to FIG. 18 to FIG. 22.

As described above, there are the following four forms of data inputted from the instruction input section 1 to the spline curve deciding section 2.

(A) FLAG=(Straight line)

Start point $P_{j-1}$, end point $P_j$, distance $c_j$, unit vector $u_j$ (B) FLAG=(Spline curve including a start point)

Coordinate for the instructed point: $P_1$, $P_2$, $P_3$, $P_4$

Distance between instructed points: $c_2$, $c_3$, $c_4$

Unit vector between instructed points: $u_2$, $u_3$, $u_4$

VFLAG (ON/OFF): tangential vector $u_s$ when VFLAG is ON.

(c) FLAG=(Spline curve)

Coordinate for the instructed point: $P_j$

Distance between instructed points: $c_j$

Unit vector between instructed points: $u_j$ (D) FLAG=(End point of a spline curve)

VFLAG (=ON, OFF): Tangential vector $u_s$ when VFLAG is ON.

Figure 18:
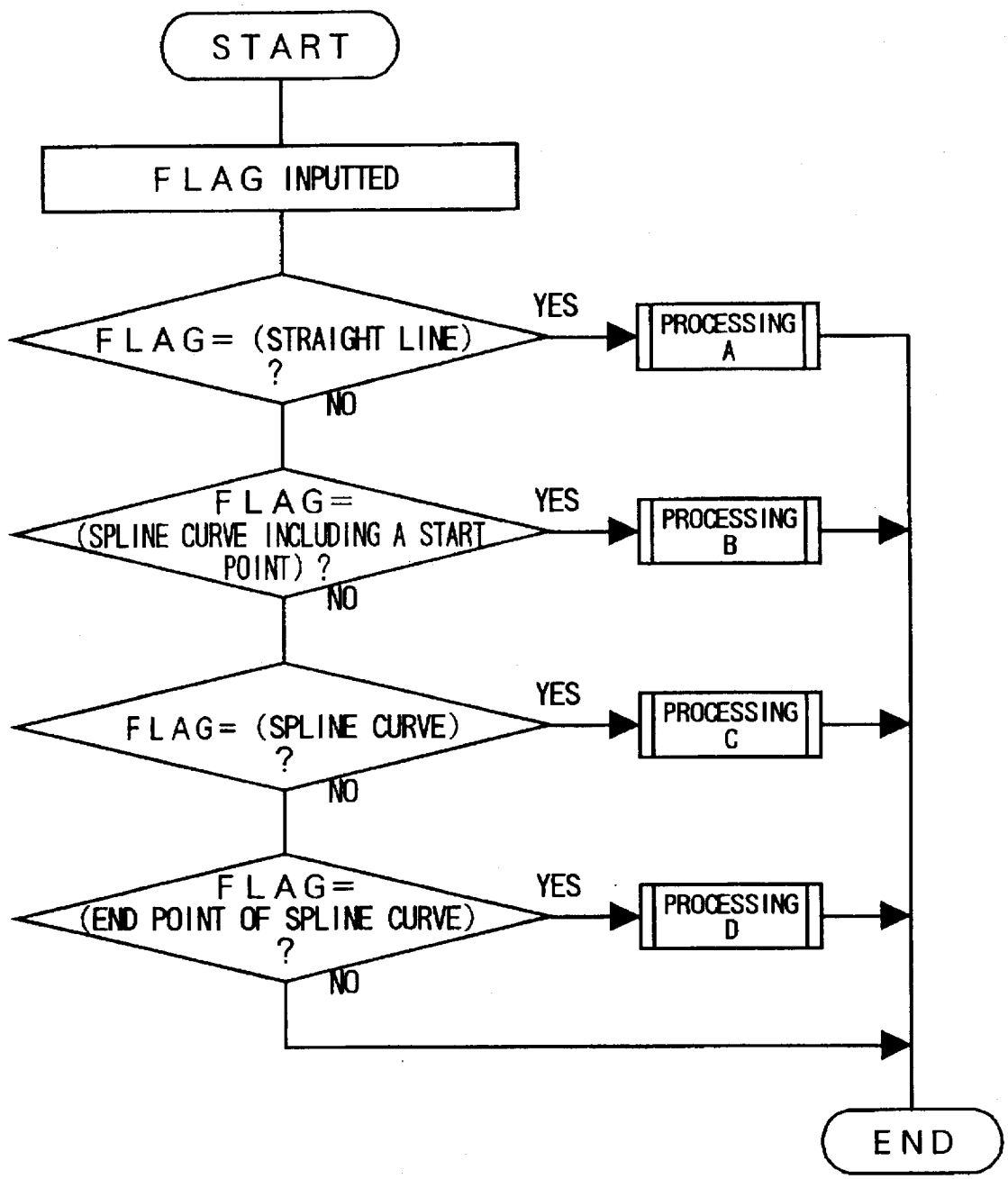
FIG. 18 is a flow chart showing a flow for whole processing in the spline curve deciding section after having differentiated the straight line section.

As shown by the processing flow in FIG. 18, system control branches to any of the processing A to D in the spline curve deciding section 2 according to a type of inputted FLAG.

Figure 19:
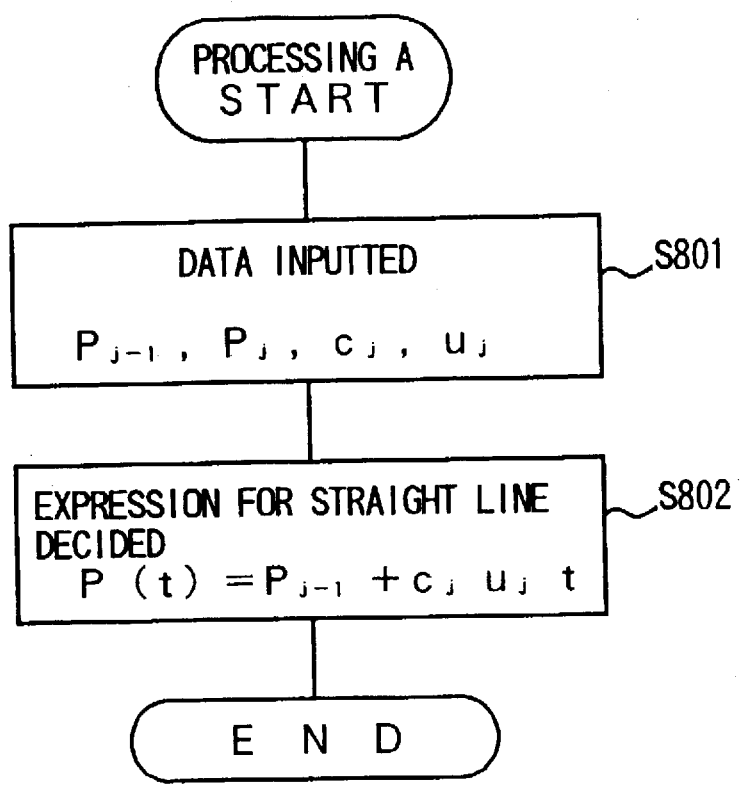
FIG. 19 is a flow chart showing a processing flow in the state where a processing pattern in the spline curve deciding section after having differentiated the straight line section is a straight line.

FIG. 19 shows a flow of processing A in the case of FLAG=(Straight line).

In the processing A, in step S801, a start point $P_{j-1}$, an end point $P_j$, a distance $c_j$, and a unit vector $u_j$ are inputted, and in step S802, a spline curve coefficient is decided as described below.

$$K_0 = P_{j-1} \tag{49a}$$

$$K_1 = c_j u_j \tag{49b}$$

$$K_2 = 0 \tag{49c}$$

$$K_3 = 0 \tag{49d}$$

Then the spline curve P(t) in the zone from $P_{j-1}$ to $p_j = K_3 t^3 + K_2 t^2 + K_1 t + K_0$ (Expression 18) is modified as shown below;

$$P(t) = c_j u_j + P_{j-1} (0 \leq t \leq 1) \tag{50}$$

and when t changes from 0 to 1, a straight line from the instructed point $P_{j-1}$ to the instructed point $P_j$ is obtained.

Figure 20:
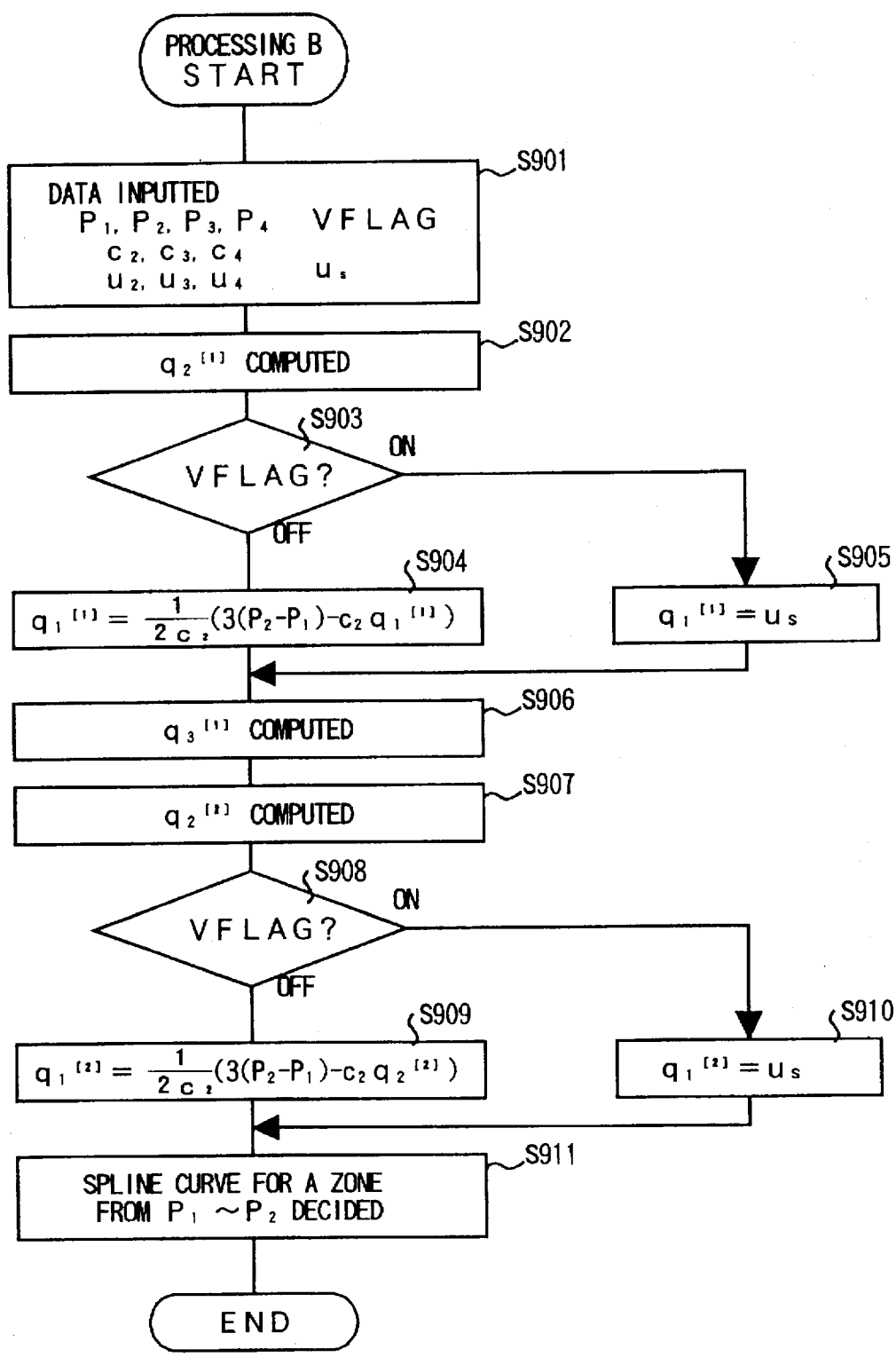
FIG. 20 is a flow chart showing a processing flow an the state where a processing pattern in the spline curve deciding section after having differentiated the straight line section is a spline curve including a start point.

FIG. 20 shows a flow of processing B in a case of FLAG=(Spline curve including a start point).

In processing B, in step S901, coordinates for instructed points $P_1$, $P_2$, $P_3$, $P_4$; distances between instructed points $c_2$, $c_3$, $c_4$; unit vectors between instructed points $u_2$, $u_3$, $u_4$; VFLAG; and tangential vector $u_s$ are inputted.

Then in step S902, a tangential vector $q_2^{[1]}$ is obtained from the Expression (8) through the following Expression (60).

$$q_2^{[1]} = \frac{1}{c_3 + c_2} (c_2 u_3 + c_3 u_2) \tag{60}$$

Then a tangential vector $q_1^{[1]}$ for the start point $P_1$ is obtained, but in step S903, the flag VFLAG is checked, and if VFLAG is OFF, from the Expression (8), and through the following expression;

$$q_1^{[1]} = \frac{1}{2c_2} (3(P_2 - P_1) - c_2 q_2^{[1]}) \tag{61}$$

$q_1^1$ is obtained (step S904).

When VFLAG is ON, $q_1^{[1]}$ is set to $u_s$, using the inputted tangential vector $u_s$, from the Expression (48a).

In step S906, a tangential vector $q_3^{[1]}$ for the instructed point $P_3$ is obtained through the Expression (62), and in step S907 a tangential vector $q_2^{[2]}$ for the instructed point $P_2$ is obtained from the tangential vector $q_3^{[1]}$ as well as from the tangential vector $q_1^{[1]}$ through the Expression (63).

$$q_3^{[1]} = \frac{1}{c_4 + c_3} (c_3 u_4 + c_4 u_3) \tag{62}$$

$$q_2^{[2]} = \frac{1}{2(c_3 + c_2)} (3(c_2 u_3 + c_3 u_2) - c_3 q_1^{[1]} - c_2 q_3^{[1]}) \tag{63}$$

Then a tangential vector $q_1^{[2]}$ for the start point $P_1$ is obtained, but like in a case where $q_1^{[1]}$ is obtained, the flag VFLAG is checked (in step S908), and if VFLAG is OFF, from the following expression;

$$q_1^{[2]} = \frac{1}{2c_2} (3(P_2 - P_1) - c_2 q_2^{[2]}) \tag{64}$$

$q_1^{[2]}$ is given (step S909), while, if VFLAG is ON, $q_1^{[2]}$ is set to $u_s$ (step S910).

With the processing described above, as tangential vectors $q_1^{[2]}$, $q_2^{[2]}$ for the two pass points $P_1$, $P_2$ from a start point of the spline curve have been decided, in step S911, coefficients $K_0$, $K_1$, $K_2$, $K_3$ for each term in the spline curve $P(t) = K_3 t^3 + K_2 t^2 + K_1 t + K_0$ are computed through the Expressions (17a) to (17d), substituting 4 for j in each expression to decide a spline curve in a zone from the pass point $P_1$ to pass point $P_2$.

Figure 21:
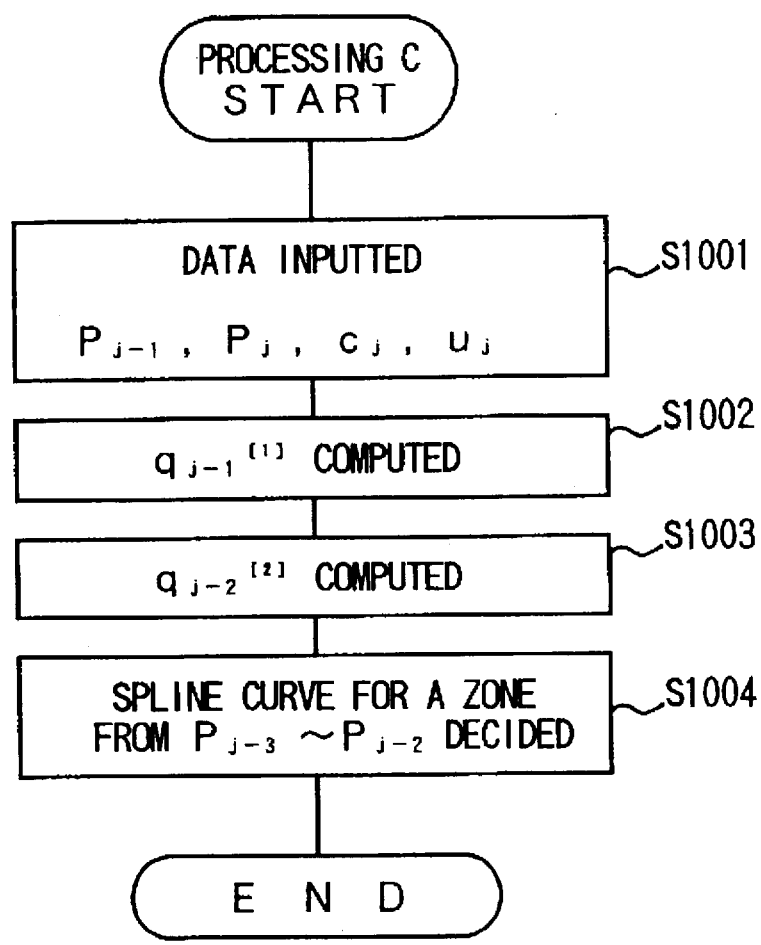
FIG. 21 is a flow chart showing a processing flow in the state where a processing pattern in the spline curve deciding section after having differentiated the straight line section is a normal spline curve.

FIG. 21 shows a flow of processing C in a case where FLAG=(spline curve).

Figure 23A:
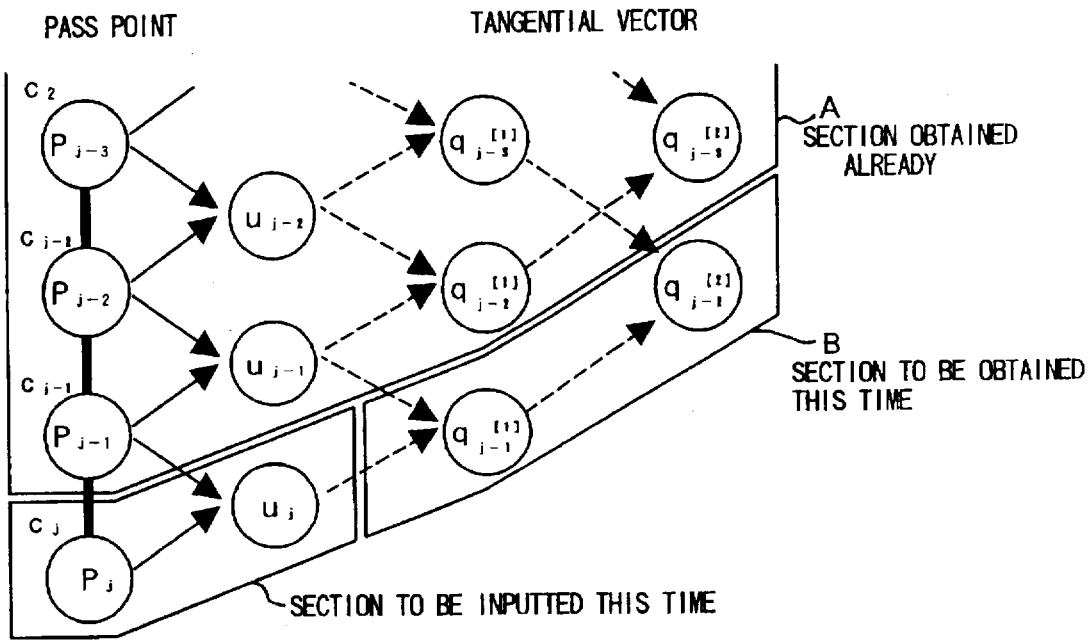
FIGS. 23A and 23B are explanatory views for explaining a portional ready obtained and a portion to be obtained in the state where a processing pattern in the spline curve deciding section by deciding a spline curve after having differentiated a straight line section is a normal spline curve or an ending point of the spline curve.

In processing C, with the processing up to the previous cycle, as the processing for the section indicated by A in FIG. 23A has been started, in this processing C, each term in section B in FIG. 23A is computed, and a spline curve for a zone from $P_{j-3}$ to $P_{j-2}$ is decided.

At first in step S1001, a coordinate value $P_j$ for the instructed point, a distance $c_j$ between instructed points, and a vector $u_j$ between instructed points are inputted.

In step S1002, a tangential vector $q_{j-1}^{[1]}$ for the instructed point $P_{j-1}$ is inputted through the Expression (65).

$$q_{j-1}^{[1]} = \frac{1}{c_j + c_{j-1}} (c_{j-1} u_j + c_j u_{j-1}) \tag{65}$$

Furthermore, in step S1003, a tangential vector $q_{j-2}^{[2]}$ for the instructed point $P_{j-2}$ is obtained through the following Expression (65).

$$q_{j-2}^{[2]} = \frac{1}{2(c_{j-1}+c_{j-2})} (3(c_{j-2}u_{j-1}+c_{j-1}u_{j-2}) - c_{j-1}q_{j-3}^{[1]}c_{j-2}q_{j-1}^{[1]}) \quad (66)$$

With the processing above, as tangential vectors $q_{j-3}^{[2]}$, $q_{j-2}^{[2]}$ for the pass points $P_{j-3}$, $P_{j-2}$ are decided, in step S1004, spline coefficients $K_0$, $K_1$, $K_2$, $K_3$ are computed through the Expressions (17a) to (17d) to decide a spline curve in a zone from $P_{j-3}$ to $P_{j-2}$.

Figure 22:
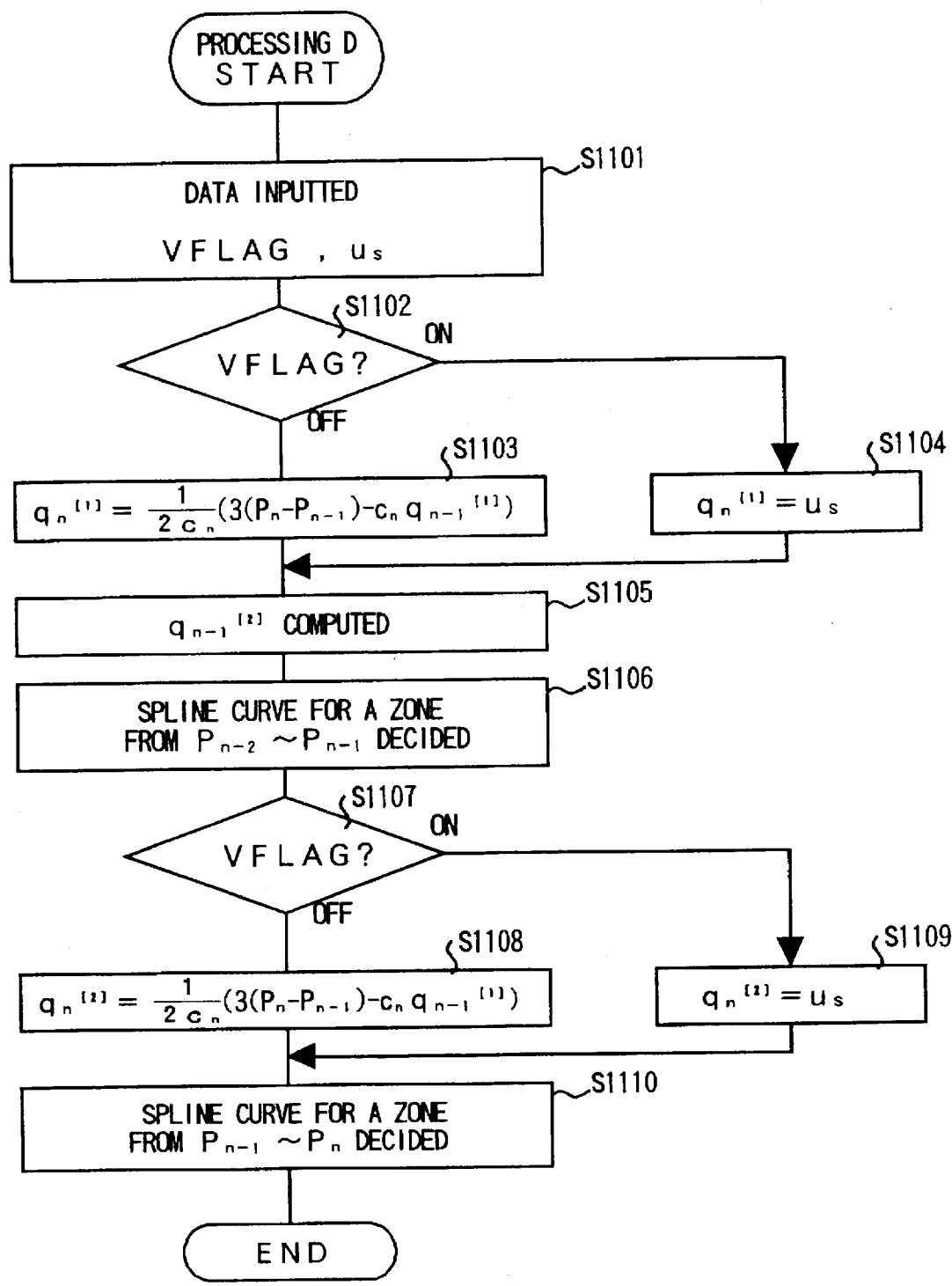
FIG. 22 is a flow chart showing a processing flow in the state where a processing pattern in the spline curve deciding section after having differentiated the straight line section is an ending point of the spline curve.
Figure 23B:
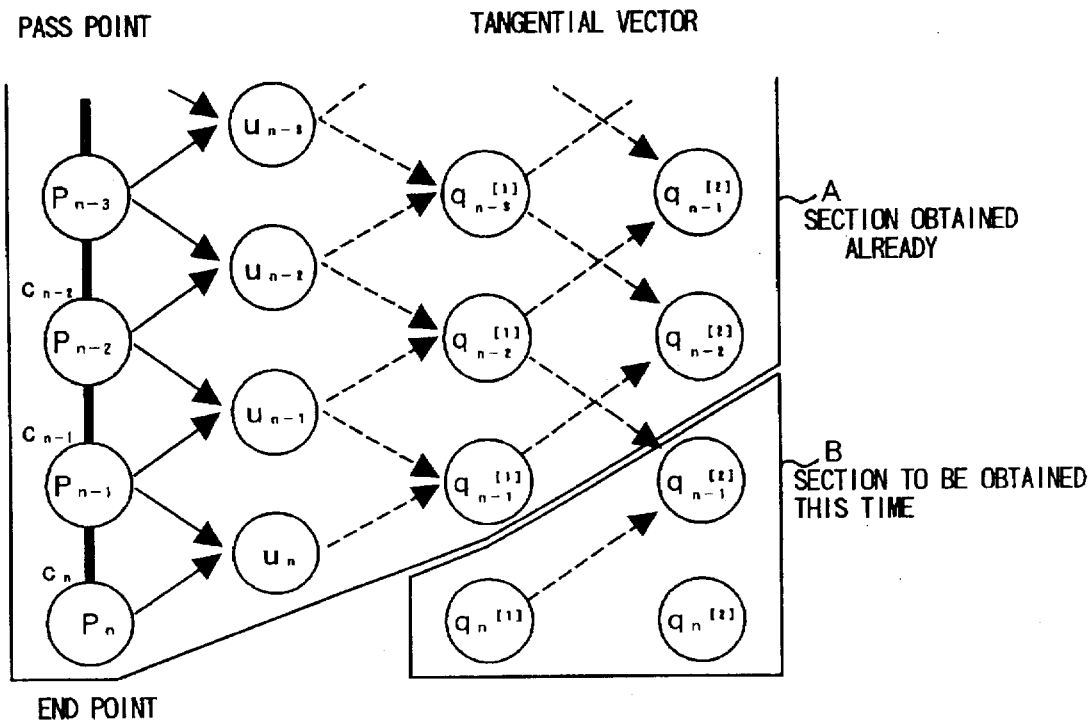
Figure 24:
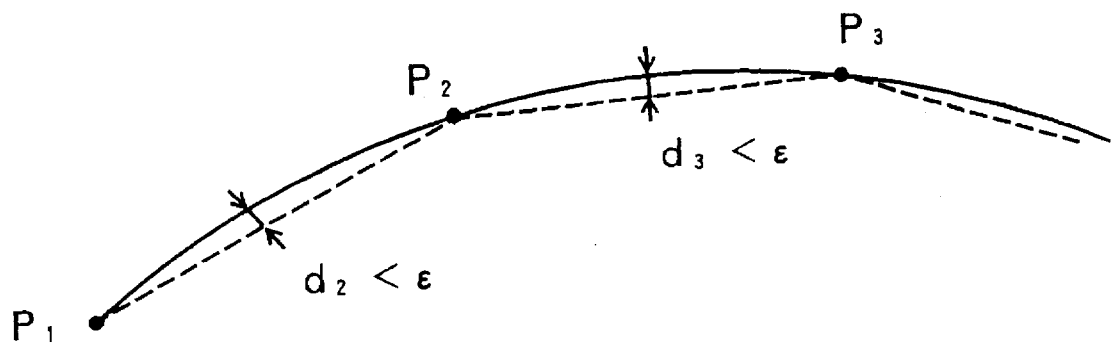
FIG. 24 is an explanatory view showing a method for dividing a curve into an array of pass points.
Figure 25:
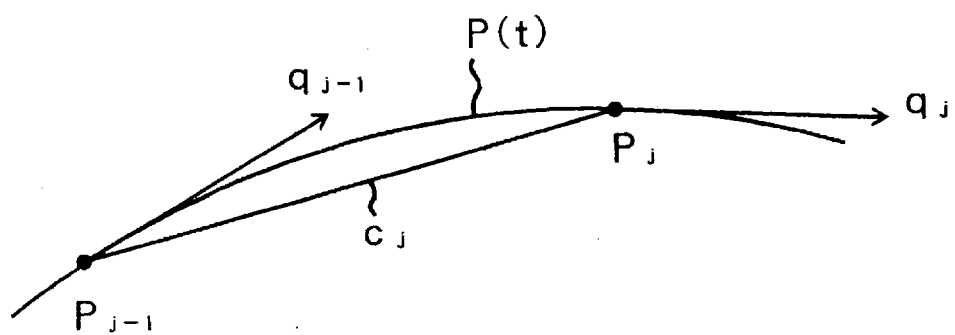
FIG. 25 is an explanatory view showing a spline curve shown with two points and the tangential vector thereof.

FIG. 22 shows a flow of processing D in a case where FLAG=(End point of spline curve). In this processing D, no pass point is inputted, and as the section indicated by A in FIG. 23B has been decide by the previous cycle, a spline curve corresponding to zones from $P_{n-2}$ to $P_{n-1}$, and from $P_{n-1}$ to $P_n$ is decided.

At first, in step S1101, a flag VFLAG, a tangential vector $u_s$ are inputted.

Then a tangential vector $q_n^{[1]}$ for the end point $P_n$ is obtained, but the flag VFLAG is checked (step S1102), and when VFLAG is OFF, the tangential vector $q_n^{[1]}$ is computed from the Expression (10) from the following Expression (67) (step 1103), $$q_n^{[1]} = \frac{1}{2c_n} (3(P_n - P_{n-1}) - c_n q_{n-1}^{[1]}) \quad (67)$$

and when VFLAG is ON, $q_n^{[1]}$ is set to $u_s$ using the tangential vector $u_s$ through the Expression (48b) (step S1104).

Then in step S1105, a tangential vector $q_{n-1}^{[2]}$ for the instructed point $P_{n-1}$ is obtained.

$$q_{n-1}^{[2]} = \frac{1}{2(c_n+c_{n-1})} (3(c_{n-1}u_n+c_nu_{n-1}) - c_nq_{n-2}^{[2]} - c_{n-1}q_n^{[2]}) \quad (68)$$

In step S1106, a spline curve P(t) for a zone from the instructed point $P_{j-3}$ to instructed point $P_{j-2}$ is obtained through the Expression (18)by substituting n+1 for j in the Expressions (17a) to (17b).

Finally, a spline curve for the final zone from the instructed point $P_{n-1}$ to the instructed point $P_n$ is computed. To obtain a tangential vector $q_n^{[2]}$ for the end point $P_n$, like in a case where $q_n^{[1]}$ is computed, the flag VFLAG is checked (step S1107) and if VFLAG is OFF, from the following expression;

$$q_n^{[2]} = \frac{1}{2c_n} (3(P_n - P_{n-1}) - c_n q_{n-1}^{[2]}) \quad (69)$$

$q_n^{[2]}$ is given (step S1108), and when VFLAG is ON, $q_n^{[2]}$ is set to $u_s$ (step S1109).

Then in step S1110, a spline curve P(t) for a zone from the instructed point $P_{j-3}$ to point $P_{j-2}$ is computed through the Expression (18) by substituting n+2 for j in the Expressions (17a) to(17d).

As clearly understood from description of the processing above, in Embodiment 3, a portion where the progressing direction is identical is separated as a straight line portion from an instructed point array constituting a curve, and an expression for a straight line as a first-dimensional expression in which a coefficient for third dimension and that for second dimension in the spline curve are set to zero (0) is given to the straight line portion to remove distortion in the form.

As for a curve section, by making a tangential vector at an end point coincident to a directional vector in the adjoining straight line section, connection between straight sections are made smooth.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A numerical control apparatus having a spline interpolating function comprising:

spline curve deciding means for deciding a spline curve smoothly connecting each of a plurality of pass points discretely set on a desired curved machining track by executing approximate calculations for a tangential vector of each pass point an arbitrary number of times;

speed control means for computing a moving speed of an object so that, when the object moves according to the spline curve decided by said spline curve deciding means, the normal acceleration will be within an allowable range; and interpolating means for computing an amount of movement of the object on the spline curve per unit time for interpolation.

2. A numerical control apparatus according to claim 1, wherein said speed control means detects the maximum clearance between a straight line and the spline curve according to a maximum curvature in a spline curve zone and the moving speed of the object is computed according to the maximum curvature so that the maximum clearance between the straight line and the spline curve will be within an allowable range.

3. A numerical control apparatus according to claim 1, wherein said spline curve deciding means obtains the tangential vector for each pass point by repeating approximate calculations an arbitrary number of times for a tangential vector of an intermediate second point from a positional relation among three successive pass points and also from tangential vectors for first and third points among the three successive points.

4. A numerical control apparatus according to claim 1, wherein said interpolating means computes the amount of movement of the object, when computing a change rate of a spline parameter per unit time for interpolation, by first obtaining coordinate values on the spline curve using a parameter change rate during a previous unit time for interpolation as a temporary parameter change rate, then executing computing for convergence so that the amount of movement of the object will coincide with a target amount of movement, and computes a true parameter change rate through said computing for convergence.

5. A numerical control apparatus according to claim 1, wherein said interpolating means computes the amount of movement of the object, when computing a change rate of a spline parameter per unit time for interpolation, by first obtaining coordinate values on the spline curve using a parameter change rate during a previous unit time for interpolation as a temporary parameter change rate, then repeats computing the parameter change rate an arbitrary number of times so that the amount of movement will coincide with a target amount of movement, and computes a true parameter change rate through this repetition of computing.

6. A numerical control apparatus according to claim 1, wherein said spline curve deciding means recognizes, in relation to pass points discretely set on said desired curved machining track, a first dot array zone in which a specified number of blocks or more from a start point proceed in a first direction, a second dot array zone in which a specified number of blocks or more before an ending point proceed in a second direction, or a third dot array zone in which a specified number of blocks or more not including the start point and the ending point proceed in a third direction as a straight line zone, and a fourth dot array zone as a spline curve zone.

7. A numerical control apparatus according to claim 6, wherein said spline curve deciding means produces, when deciding a spline curve in a spline curve zone separated as a straight line zone, a tangential vector for a spline curve at a border point between the straight line zone and the spline curve zone as a unit vector indicating a direction of the straight line zone.

8. A numerical control apparatus according to claim 6, wherein said spline curve deciding means produces a straight line by setting a tertiary coefficient and a secondary coefficient of the spline curve to zero respectively in the straight line zone.

9. A numerical control apparatus according to claim 1, wherein said speed control means sets the moving speed of the object in a spline curve zone so that the normal acceleration at edge points of the spline curve zone will be within an allowable range.

10. A numerical control apparatus according to claim 1, wherein said object is a tool.

11. A numerical control apparatus having a spline interpolating function comprising:
    spline curve deciding means for deciding a spline curve smoothly connecting each of a plurality of pass points discretely set on a desired curved machining track by executing approximate calculations for a tangential vector of each pass point an arbitrary number of times;
    speed control means for computing a moving speed of an object so that, when the object moves on a straight line according to the spline curve decided by said spline curve deciding means, a maximum clearance between the straight line and the spline curve will be within an allowable range; and
    interpolating means for computing an amount of movement of the object on the spline curve per unit time for interpolation.

12. A numerical control apparatus according to claim 11, wherein said speed control means detects the maximum clearance between the straight line and the spline curve according to a maximum curvature in a spline curve zone and the moving speed of the object is computed according to the maximum curvature so that the maximum clearance between the straight line and the spline curve will be within said allowable range.

13. A numerical control apparatus according to claim 11, wherein said spline curve deciding means obtains the tangential vector for each pass point by repeating approximate calculations arbitrary times for a tangential vector of an intermediate second point from a positional relation among three successive pass points and also from tangential vectors for the first and third points.

14. A numerical control apparatus according to claim 11, wherein said interpolating means computes the amount of movement of the object, when computing a change rate of a spline parameter per unit time for interpolation, by first obtaining coordinate values on the spline curve using a parameter change rate during a previous unit time for interpolation as a temporary parameter change rate, then executing computing for convergence so that the amount of movement of the object will coincide with a target amount of movement, and computes a true parameter change rate through said computing for convergence.

15. A numerical control apparatus according to claim 11, wherein said interpolating means computes the amount of movement of the object, when computing a change rate of a spline parameter per unit time for interpolation, by first obtaining coordinate values on the spline curve using a parameter change rate during a previous unit time for interpolation as a temporary parameter change rate, then repeats computing the parameter change rate arbitrary times so that the amount of movement will coincide with a target amount of movement, and computes a true parameter change rate through this repetition of computing.

16. A numerical control apparatus according to claim 11, wherein said spline curve deciding means recognizes, in relation to pass points discretely set on said desired curved machining track, first dot array zone in which a specified number of blocks or more from a start point proceed in a first direction, second dot array zone in which a specified number of blocks or more before an ending point proceed in a second direction, or a third dot array zone in which a specified number of blocks or more not including the start point and the ending point proceed in a third direction as a straight line zone, and a fourth dot array zone as a spline curve zone.

17. A numerical control apparatus according to claim 16, wherein said spline curve deciding means gives, when deciding a spline curve in a spline curve zone separated as a straight line zone, a tangential vector for a spline curve at a border point between the straight line zone and the spline curve zone as a unit vector including a direction of the straight line zone.

18. A numerical control apparatus according to claim 16, wherein said spline curve deciding means gives a straight line by setting a tertiary coefficient and a secondary coefficient of the spline curve to zero respectively in the straight line zone.

19. A numerical control apparatus according to claim 11, wherein said object is a tool.

* * * * *